United States Patent [19]

Imai et al.

[11] Patent Number: 5,717,880
[45] Date of Patent: Feb. 10, 1998

[54] METHOD AND APPARATUS FOR RELAYING EVENTS AND REQUESTS IN A WINDOWS SYSTEMS

[75] Inventors: Toru Imai; Tetsuro Muranaga; Masaaki Akutsu; Mami Kodama, all of Kanagawa-ken, Japan

[73] Assignee: Kabushiki Kaisha Toshiba, Kawasaki, Japan

[21] Appl. No.: 300,999

[22] Filed: Sep. 6, 1994

[30] Foreign Application Priority Data

Sep. 6, 1993 [JP] Japan .................................. 5-220358
Sep. 14, 1993 [JP] Japan .................................. 5-228742

[51] Int. Cl.⁶ .................................................. G06F 3/00
[52] U.S. Cl. .................................... 395/340; 395/680
[58] Field of Search .......................... 395/700, 155–161, 395/326–358, 680; 345/119–120, 173

[56] References Cited

U.S. PATENT DOCUMENTS

| | | | |
|---|---|---|---|
| 4,903,218 | 2/1990 | Longo et al. | 395/157 |
| 5,253,340 | 10/1993 | Inoue | 395/158 X |
| 5,289,574 | 2/1994 | Sawyer | 395/157 |
| 5,347,627 | 9/1994 | Hoffmann et al. | 395/157 |
| 5,379,374 | 1/1995 | Ishizaki | 395/155 |
| 5,408,602 | 4/1995 | Giokas et al. | 395/157 |
| 5,491,495 | 2/1996 | Ward et al. | 345/173 |

OTHER PUBLICATIONS

Scheifler et al, "The X Window System", ACM Transactions on Graphics, vol. 5, No. 2, pp. 79–109, Apr. 1986.

H. Abdel-Wahab et al., "XTV: A Framework for Sharing X Window Clients in Remote Synchronous Collaboration", IEEE 1991 Communications for Distributed Applications and Systems.

Primary Examiner—John E. Breene
Attorney, Agent, or Firm—Foley & Lardner

[57] ABSTRACT

A scheme for controlling a screen display capable of allowing the addition of new functions such as the note entry and pointing according to the input events not requested by the application program, and preserving the meaning attributed to the drawings related to the windows even when the window state change is made. The screen display is controlled by transmitting the inputs entered at the input device as input events to an application program, and supplying the display requests made by the application program according to the prescribed types of the input events as well as the display requests according to the input events other than the prescribed types to the output device. Input events are transmitted to a window server program and then transmitted to a communication relay program which handles input events and output requests from the application program to the window server. Also, when the display of the window data is changed, the display of the drawing data is also changed in accordance with a change made in the display of the window data.

8 Claims, 32 Drawing Sheets

| WINDOW ID | POSITION | SIZE | OPEN/CLOSED | RELATED DATA |
|---|---|---|---|---|
| W1 | (Px1, Py1) | (Sx1, Sy1) | OPEN | |
| W2 | (Px2, Py2) | (Sx2, Sy2) | OPEN | |
| W3 | (Px3, Py3) | (Sx3, Sy3) | CLOSED | |
| | | | | |

| WINDOW ID | POSITION | SIZE | OPEN/ CLOSED | RELATED DATA |
|---|---|---|---|---|
| W1 | (Px1', Py1') | (Sx1, Sy1) | OPEN | |
| W2 | (Px2, Py2) | (Sx2, Sy2) | OPEN | |
| W3 | (Px3, Py3) | (Sx3, Sy3) | CLOSED | |
| | | | | |

| WINDOW ID | POSITION | SIZE | OPEN/ CLOSED |
|---|---|---|---|
| W1 | (Px1', Py1') | (Sx1, Sy1) | OPEN |
| W2 | (Px2', Py2') | (Sx2, Sy2) | OPEN |
| W3 | (Px3, Py3) | (Sx3, Sy3) | CLOSED |
| | | | |

FIG.32

| DRAWING ID | TYPE | ATTRIBUTE | DISPLAY STATUS |
|---|---|---|---|
| D1 | FREEHAND CURVE | | DISPLAYED |
| D2 | CHARACTER STRING | | DISPLAYED |
| | | | |

| $(x1+\delta x, y1+\delta y)$ | $(x2+\delta x, y2+\delta y)$ | ... | $(0,0)$ |

| $(Pd2x+\delta d, Pd2y+\delta y)$ | $(Sd2x, Sd2y)$ | O | K | ? | \0 |

# METHOD AND APPARATUS FOR RELAYING EVENTS AND REQUESTS IN A WINDOWS SYSTEMS

BACKGROUND OF THE INVENTION

1. Field of the Invention

The present invention relates to a screen display in window systems used on the workstations or the personal computers, and more particularly, to a scheme for controlling display requests and display data used for the screen display.

2. Description of the Background Art

As a window system in which a window server program for controlling input devices such as a keyboard and a mouse and output devices such as a bit map display communicates with the application programs, there are well known examples such as the X window system (Trade mark of Consortium, Inc.) and the Open Window system (Trade mark of the Sun Microsystems, Inc., U.S.A.). The window server program in such a window system is equipped with an input event transmission program for processing the inputs from the input devices as events, and an output request processing program for controlling the output devices.

In the window system such as the X window system, in order to cut off innecessary communications between the window server program and the application programs, the types of input events required by each application program are solicited to the window server program in advance such that the input event transmission program of the window server program transmits only those types of input events which are required to be transmitted to each application program.

Thus, in a case the application program does not solicit the input event concerning the mouse movement to the window server program, it has been impossible to provide a superposition of entering notes, or displaying a pointer according to the mouse movement event on the display window of the application program.

In this regard, it is possible to modify the application program to solicit the transmission of the input events not solicited originally to the window server program whenever the need arises, but this can lead to the loss of the binary compatibility, and this also requires many changes in the application program because it would be necessary to modify the execution procedure of the program in order to add the processing related to such new input events. Moreover, it is practically impossible to make such addition of new functions in all of the abundantly available application programs.

On the other hand, in the window system a single screen display can be used in forms of a plurality of windows, it is possible to make inputs for drawing straight lines, curves, or characters with respect to the window display provided by the application program executed in each window, as the annotation or the memorandum by the user. Such drawing inputs can be entered even in a case the application program executed in the window itself does not account for the drawing inputs.

The entered drawings are controlled under the window management program, and in a case of the window state change such as a moving of the window, a closing of the opened window, or an opening of the closed window, the drawings which are contained entirely within one window are also changed in accordance with the window state change by being moved, deleted, or re-displayed. However, as for the drawings which are not entirely contained within one window such as those indicating the relationship between a plurality of windows or associating the figures displayed inside different windows, when a part of the relevant windows is subjected to the window state change such as the moving, the closing, or the opening of the window, the other windows and a part of the drawings not contained in a part subjected to the window state change are going to be left behind, and the meanings of the drawings intended at a time of their entry cannot be preserved.

For example, in a case one window and the other window are associated with each other by some drawings, even when this one window is moved, the positions of a part of the drawings not contained within the window region of this one window and the other window which is associated with this one window by the drawings remain unmoved, so that the correspondence between the associated windows or the correspondence between the characters and figures displayed within these windows cannot be maintained. Similarly, even when one window is closed and iconized, a part of the drawings not contained within the window region of this one window and the other window which is associated with this one window by the drawings remain displayed as before, so that the correspondence between the associated windows or the correspondence between the characters and figures displayed within these windows cannot be maintained. In particular, when the drawing represents the character string and only a part of this character string is located within the window region of the window subjected to the window state change, only this part of the character string is also subjected to the change while the other part remains unchanged, so that the meaning expressed by this character string can be completely lost.

SUMMARY OF THE INVENTION

It is therefore an object of the present invention to provide a method and an apparatus for controlling a screen display capable of allowing the addition of new functions such as the note entry and the pointing according to the input events not solicited by the application program, while utilizing the abundant software resources already available without requiring the modification of the application program itself.

It is another object of the present invention to provide a method and an apparatus for controlling a screen display capable of preserving the meaning attributed to the drawings related to the windows even when the window state change is made on a part of the windows for which the drawing inputs are entered.

According to one aspect of the present invention there is provided an apparatus for controlling a screen display, comprising: input device for entering inputs; output device for providing the screen display according to display requests; a server unit for transmitting the inputs entered at the input device as input events, and supplying the display requests to the output device; and a relay unit for relaying the input events transmitted from the server unit to an application program and output requests transmitted from the application program to the server unit, and soliciting first types of the input events solicited by the application programs as well as second types of the input events other than the first types to the server unit; wherein the server unit transmits the first and second types of the input events solicited by the relay unit to the relay unit and supplies the display requests to the output device in response to the output requests transmitted from the relay unit.

According to another aspect of the present invention there is provided an apparatus for controlling a screen display, comprising: input device for entering inputs; output device for providing the screen display according to display requests; and control means for obtaining input events from the inputs entered at the input device, transmitting first types of the input events solicited by an application program to the application program, and supplying the display requests to the output device in response to second types of the input events other than the first types as well as output requests transmitted from the application program.

According to another aspect of the present invention there is provided a method for controlling a screen display, comprising the steps of: entering inputs at an input device; soliciting first types of input events solicited by the application programs as well as second types of input events other than the first types from a relay program to a server program; obtaining the input events from the inputs entered at the input device, and transmitting the first and second types of the input events from the server program to the relay program; relaying the input events transmitted from the server program to the application program, and output requests transmitted from the application program to the server program, at the relay program; supplying display requests from the server program to an output device in response to the output requests relayed by the relay program; and providing the screen display at the output device according to the display requests supplied from the server program.

According to another aspect of the present invention there is provided a method for controlling a screen display, comprising the steps of: entering inputs at an input device; providing the screen display at an output device according to display requests; and controlling the screen display by obtaining input events from the inputs entered at the input device, transmitting first types of the input events solicited by an application program to the application program, and supplying the display requests to the output device in response to second types of the input events other than the first types as well as output requests transmitted from the application program.

According to another aspect of the present invention there is provided an apparatus for controlling a screen display, comprising: window display means for displaying window data on the screen display; drawing display means for displaying drawing data in superposition to the window data displayed by the window display means; window changing means for changing the window data displayed by the window display means; and drawing changing means for changing the drawing data displayed by the drawing means in accordance with a change made in the window data by the window changing means.

According to another aspect of the present invention there is provided a method for controlling a screen display, comprising the steps: (a) displaying window data on the screen display; (b) displaying drawing data in superposition to the window data displayed by the window display means; (c) changing the window data displayed at the step (a); and (d) changing the drawing data displayed at the step (b) in accordance with a change made in the window data at the step (c).

Other features and advantages of the present invention will become apparent from the following description taken in conjunction with the accompanying drawings.

BRIEF DESCRIPTION OF THE DRAWINGS

FIG. 32 is a diagram of exemplary drawing data used in the system of FIG. 15 obtained from that of FIG. 18 by the operation of FIGS. 29A and 29B.

DETAILED DESCRIPTION OF THE PREFERRED EMBODIMENTS

Now, the first embodiment of a system for controlling a screen display according to the present invention will be described in detail.

Figure 1:
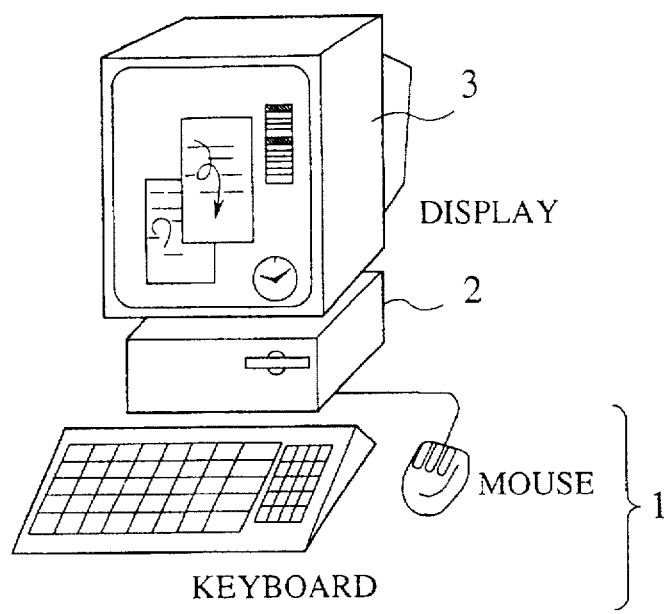
FIG. 1 is a perspective view of an overall configuration of a system for controlling a screen display according to the present invention.

Here, the system has an overall configuration as shown in FIG. 1 in a form of a computer terminal device such as the workstation or the personal computer, which comprises an input device 1 such as a keyboard and a mouse for entering inputs from the user, a processing device 2 for processing the inputs entered from the input device 1, and an output device 3 such as a display device for displaying the processing result obtained by the processing device 2.

Figure 2:
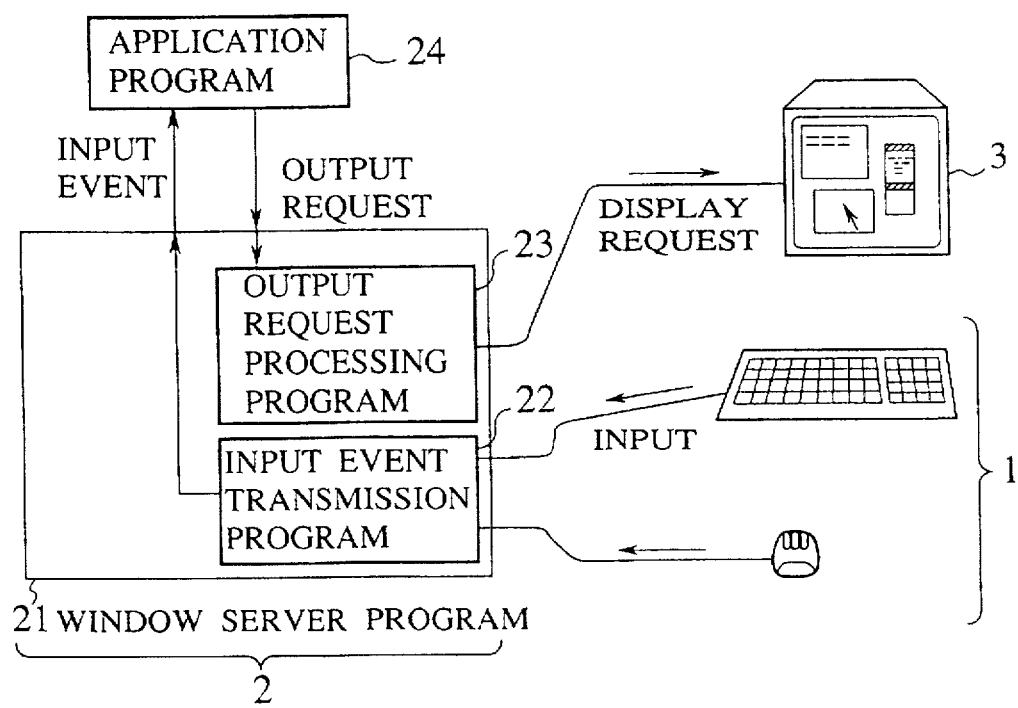
FIG. 2 is a block diagram of a conventional system for controlling a screen display corresponding to the system of FIG. 1.
Figure 3:
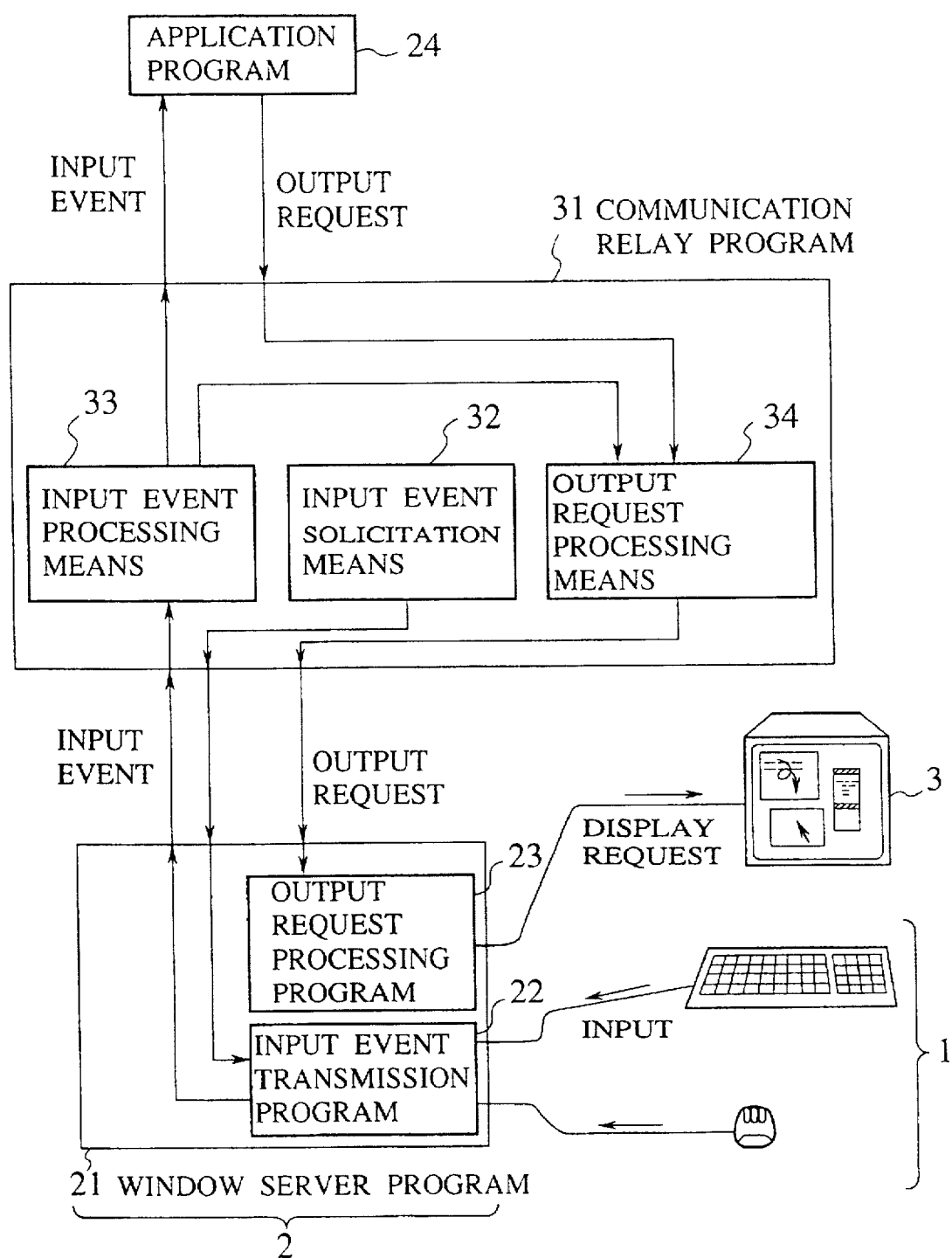
FIG. 3 is a block diagram of a first embodiment of a system for controlling a screen display according to the present invention.

In this system configuration, a conventional scheme for controlling the window display will be described first. Namely, as shown in FIG. 2, in the conventional window system such as the X window system, in order to display a plurality of windows on the output device 3, a window server program 21 is activated in the processing device 2. Here, the window server program 21 includes an input event transmission program 22 for processing the inputs entered from the input device 1 as inputs events and transmitting the input events to an application program 24, and an output request processing program 23 for outputting a display request to the output device 3 in response to an output request made by the application program 24 as a is result of processing the input events.

In a case of the X window system, the input event transmission program 22 and the output request processing program 23 are integrally provided as a single window server program 21, but the input event transmission program 22 and the output request processing program 23 may very well be provided as separate programs. In the following, the window server program 21 is assumed to be including both the input event transmission program 22 and the output request processing program 23 as shown in FIG. 2.

Now, in the conventional scheme, in order to reduce the amount of communications between the window server program 21 and the application program 24, the application program 24 defines the types of input events which are to be processed therein and solicits the transmission of these input events alone to the window server program 21 in advance. Then, at the window server program 21, only the input events of the types solicited by the application program 24 are subsequently transmitted to the application program 24.

Figure 8:
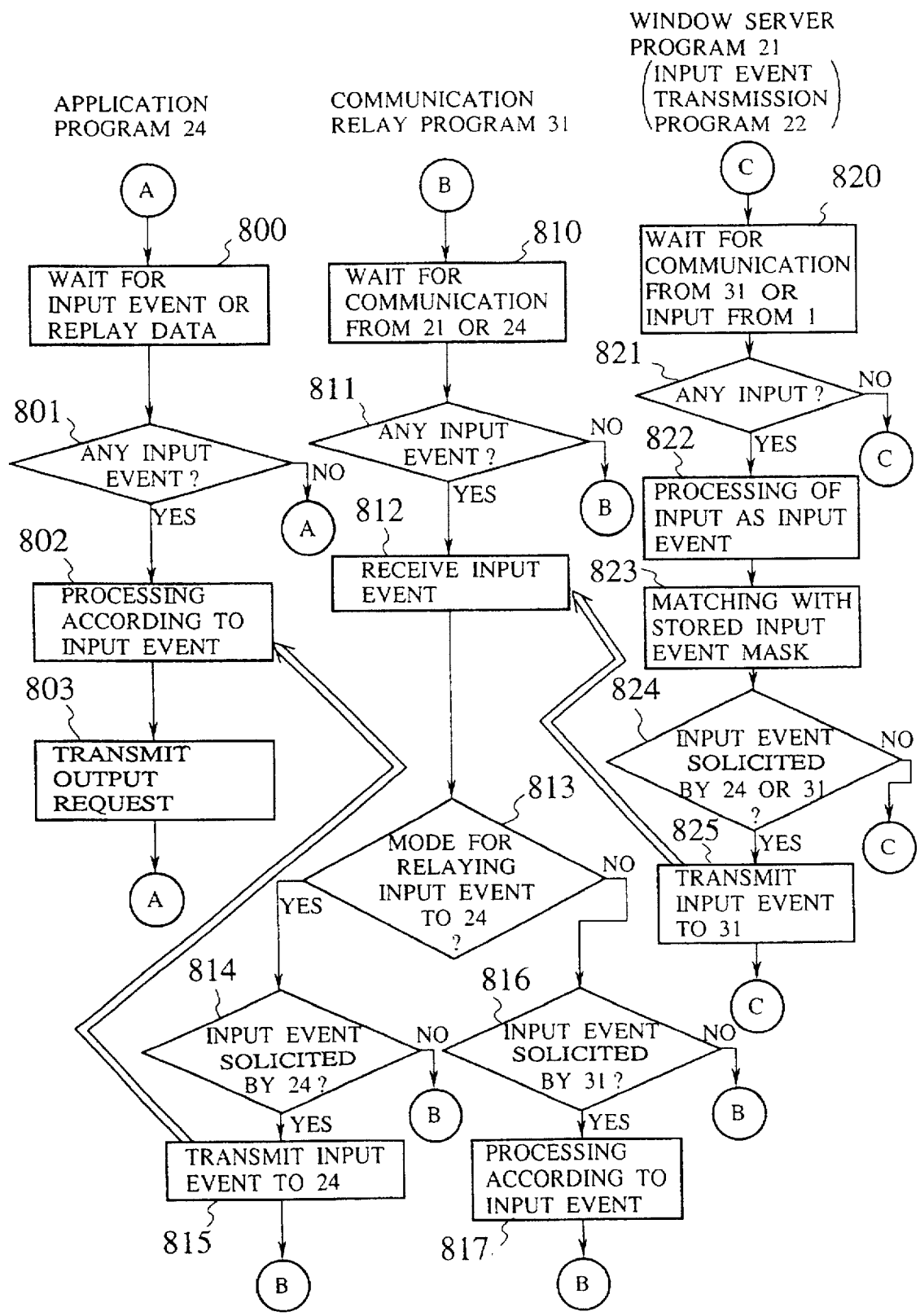
FIG. 8 is a flow chart of an input event processing operation in the system of FIG. 3.

In contrast, according to the first embodiment of the present invention, the conceptual configuration of FIG. 2 is modified as shown in FIG. 8, in which a communication relay program 31 is provided between the window server program 21 and the application program 24. This communication relay program 31 relays the communication of the input event from the input event transmission program 22 to the application program 24 as well as the communication of the output request from the application program 24 to the output request processing program 23. Here, the input event transmission program 22 and the output request processing program 23 are included within the window server program 21 in this embodiment, so that the communication relay program 31 is effectively relaying the communications between the window server program 21 and the application program 24.

This communication relay program 31 includes an input event soliciting means 32, an input event processing means 33, and an output request processing means 34 which will be described in detail now.

In this embodiment, the input event processing program 22 in the window server program 21 is programmed to transmits only the input events of the types solicited by the application program 24 in advance, so that only the input events of the types solicited by the application program 24 in advance are normally supplied to the communication relay program 31 which relays the communication of these input events. On the other hand, the input event soliciting means 32 solicits the transmission of the input events other than those originally solicited by the application program 24 to the input event transmission program 22. In response, the input event transmission program 22 transmits the solicited input events to the input event processing means 33.

At the input event processing means 33, the input events normally supplied from the input event transmission program 22 are transmitted to the application program 24 as they are, but for the input events transmitted in response to the solicitation from the input event soliciting means 32, the output requests are generated in the input event processing means 33 and transmitted to the output request processing means 34. Then, the output request processing means 34 relays the output requests transmitted from either the application program 24 or the input event processing means 33 to the output request processing program 23.

It is to be noted here that the input event soliciting means 32 may be omitted in a case the input event transmission program 22 is programmed to transmit not just the input events solicited by the application program 24 but also the other input events as well to the input event processing means 33.

Figure 4:
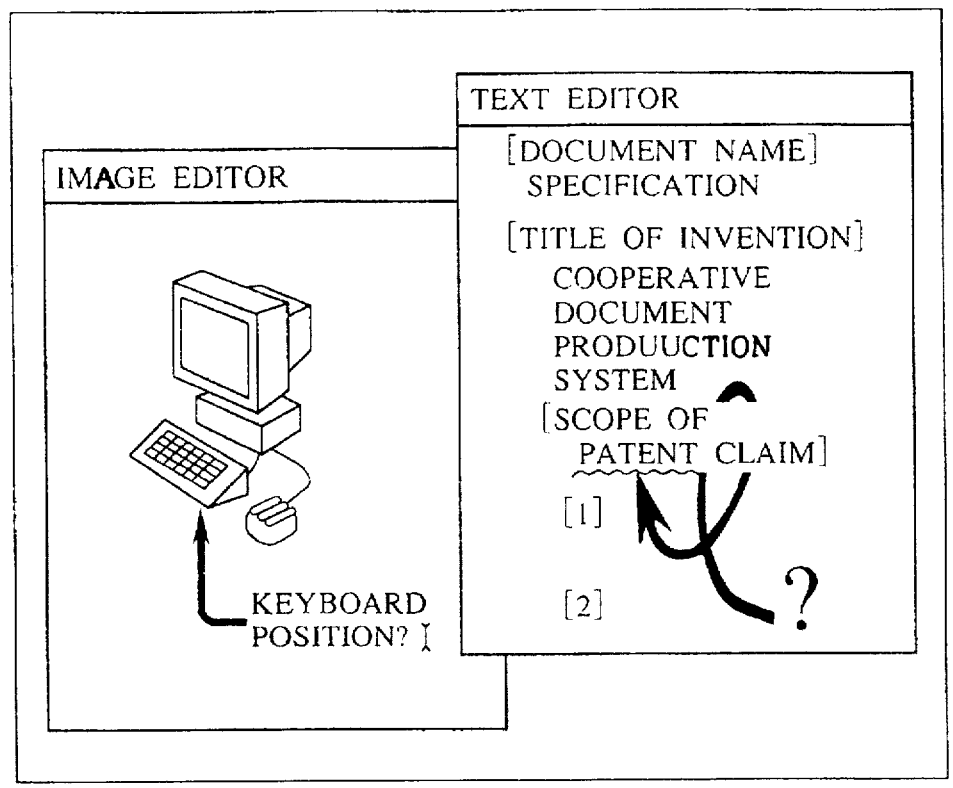
FIG. 4 is an illustration of an exemplary screen display in the system of FIG. 3.

In this first embodiment, an exemplary screen display on the output device 3 appears in a form of the window display as shown in FIG. 4. In this exemplary screen display of FIG. 4, it is possible to superpose the drawing by the mouse or the pen and the character inputs by the keyboard on the window display without affecting the application program 24 such as the text editor for editing documents, by means of the communication relay program 31.

Namely, a type of application program 24 such as the text editor originally does not solicit a type of input events such as the mouse movements to the input event transmission program 22, so that it has conventionally been impossible to superpose the drawings by the mouse on the window display of this type of the application program 24. However, in this first embodiment, the input event soliciting means 32 of the communication relay program 31 solicits a type of input events such as the mouse movements to the input event transmission program 22, so that when the user moves the mouse, the input events of the mouse movements are supplied to the communication relay program 31. Then, the input event processing means 33 controls the output request processing means 34 to superpose the drawings according to the mouse movement events on the window display of the window in which the application program 24 is executed, so as to realize the superposition even on the window display of an application program 24 such as a text editor.

Similarly, it is also possible in this first embodiment to superpose the character inputs from the keyboard on the window display of an application program 24 which originally does not solicit the keyboard input events such as an image editor.

Figure 5:
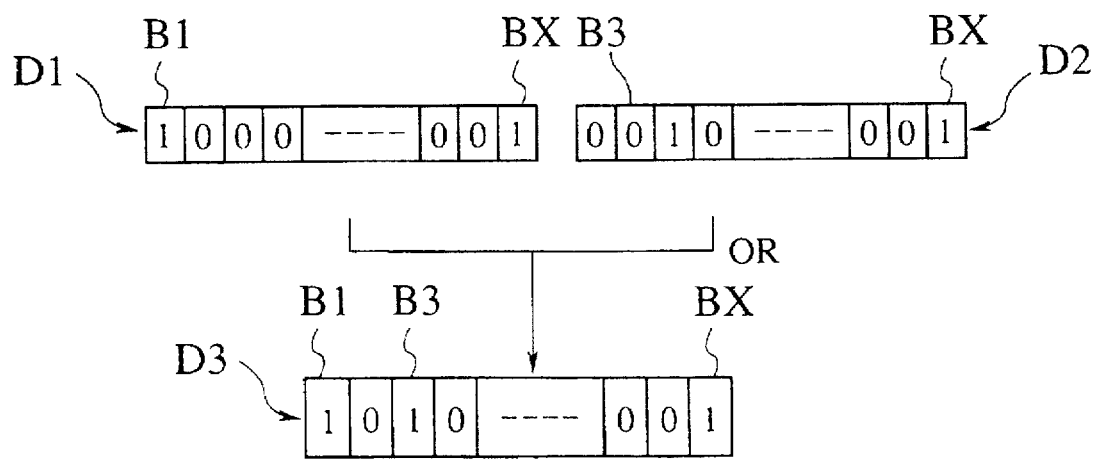
FIG. 5 is a diagram of input event masks used in the system of FIG. 3.

In the communication relay program 31 of this first embodiment, the data is managed in a data structure shown in FIG. 5, which defines the types of input events whose transmission is to be soliticed to the input event transmission program 22 in the window server program 21. Here, the data is given in the vector representation (bit vector) formed by a bit sequence, in which each bit corresponds to one type of input event. Then, the bit with the value 1 indicates that a transmission of the input event represented by this bit is to be solicited to the input event transmission program 22, while the bit with the value 0 indicates that a transmission of the input event represented by this bit is not to be solicited to the input event transmission program 22. Thus, a total number of bits in this bit vector is equal to the number of types of input events that can be transmitted by the input event transmission program 22.

In the example shown in FIG. 5, an input event mask D1 defines types of input events solicited by the application program 24, where the bits B1 and BX have values 1 indicating that transmission of the input events that the key of the keyboard has pressed and that the window display content has changed are to be solicited to the input event transmission program 22. On the other hand, an input event mask D2 defines types of input events solicited by the communication relay program 31 for the purpose of adding functions, where the bits B3 and BX have the values 1 indicating that a transmission of the input events that the mouse has moved and that the window display content has changed are to be solicited to the input event transmission program 22.

Then, at the input event solicitation means 32 of the communication relay program 31, the OR of the bit vectors of these input event masks D1 and D2 is calculated to obtain an input event mask D3 which is actually transmitted to the input event transmission program 22.

The input event transmission program 22 then stores the bit vector of the input event mask D3, and whenever the input from the input device 1 is processed as an input event, the type of input events whose transmission is solicited by this stored bit vector is transmitted to the communication relay program 31.

In this manner, the mouse movement is also transmitted as the input event to the communication relay program 31 even though it is not soloicted by the application program 24, so that the communication relay program 31 is capable of executing the processing according to this input event of the mouse movement. That is, by the input event processing means 33 of the communication relay program 31, it becomes possible to add the function for superposing the drawing specified by the mouse movement the window display of the application program 24.

Now, the operations of the application program 24, the communication relay program 31, and the window server program 21 in this first embodiment will be described in detail.

Figure 6:
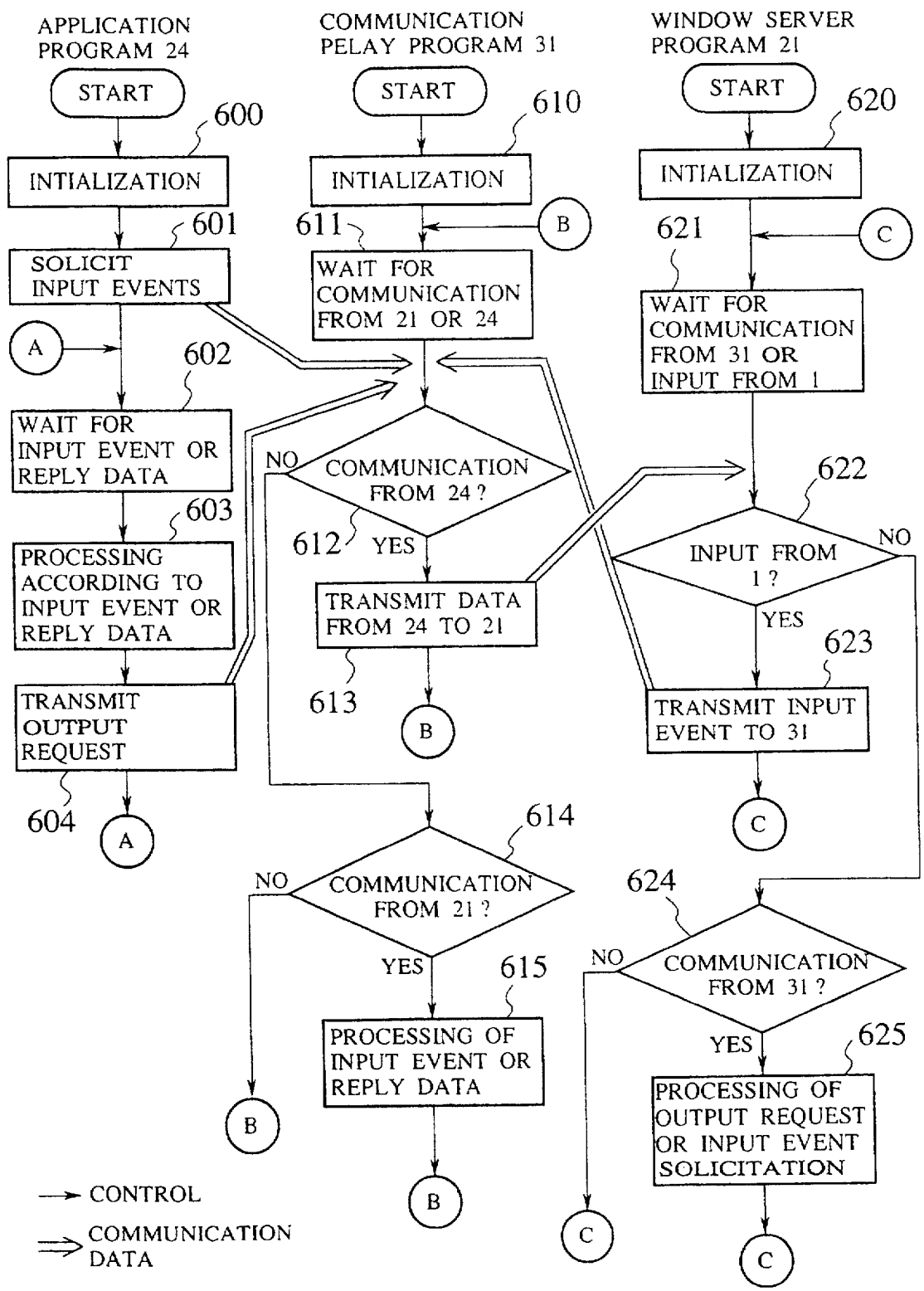
FIG. 6 is a flow chart of a control operation in the system of FIG. 3.

FIG. 6 shows a schematic flow chart for the control operations at the application program 24, the communication relay program 31, and the window server program 21, in which thin arrows indicate the flows of program control while thick arrows indicate the flows of the communication data among the programs.

First, at the application program 24, after the initialization processing (step 600) including the connection with the communication relay program 31, the types of input events to be processed therein are defined and the transmission of the defined input events is solicited (step 601), and then the communication from the communication relay program 31 is awaited (step 602). Here, the communication from the communication relay program 31 is either the solicited input event or the reply data for the output request. Then, the processing according to the received input event or reply data is carried out (step 603), and the output request is transmitted to the communication relay program 31 whenever necessary (step 604). After that the operation of the application program 24 returns to the step 602. Thus, the operation of the application program 24 is the event driven type loop in which the communication from the communication relay program 31 is awaited and the necessary processing is carried out whenever the communication is received.

On the other hand, at the communication relay program 31, after the initialization processing (step 610) including the connection with the window server program 21 (both the input event transmission program 22 and the output request processing program 23), the communication from the window server program 21 or the application program 24 is awaited (step 611). When there is a communication from the application program 24 (step 612), the data transmitted from the application program 24 is transmitted to the window server program 21 (step 613) and the operation returns to the step 611. When there is a communication from the window server program 21 (step 614), the processing of the data transmitted from the window server program 21 which is either the input event or the reply data is carried out (step 615) and the operation returns to the step 611.

As for the window server program 21, after the initialization (step 620), the communication from the communication relay program 31 or the input from the input device 1 is awaited (step 621). When there is an input from the input device 1 (step 622), the input is processed as the input event, and only the solicited type of input event is transmitted to the communication relay program 31 (step 623) and the operation returns to the step 621). When there is a communication from the communication relay program 31 (step 624), the processing of the data transmitted from the communication relay program 31 which is either the output request or the input event solicitation is carried out (step 625) and the operation returns to the step 621.

In the following, the operations in cases of the input event solicitation, the input event processing, and the output request processing will be described in further detail with references to FIG. 7, FIG. 8, and FIG. 9, respectively.

Figure 7:
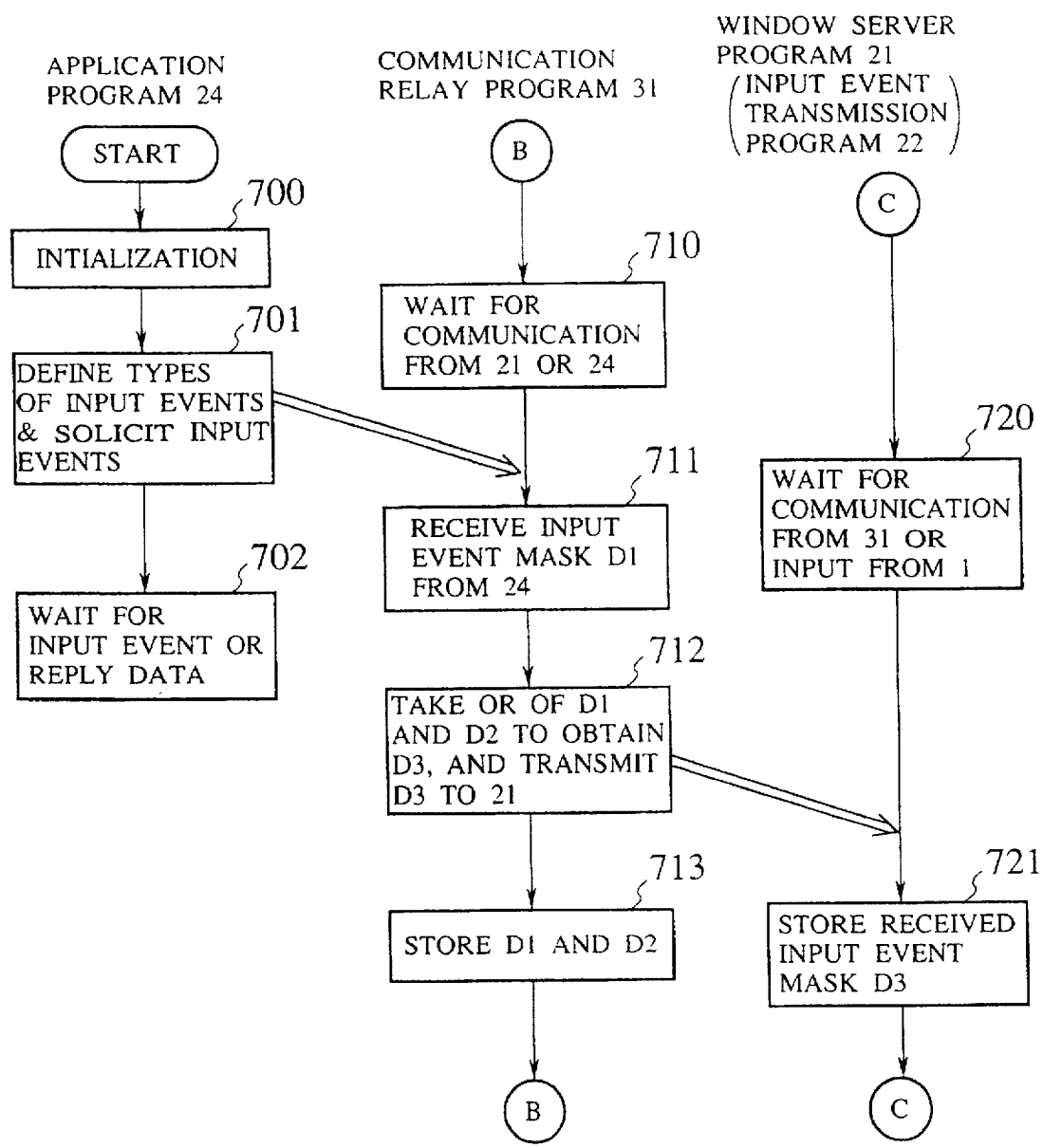
FIG. 7 is a flow chart of an operation for defining types of input events in the system of FIG. 3.

FIG. 7 is a flow chart of the operation for defining the types of input events to be transmitted with respect to the window server program 21.

In this case, at the application program 24, after the initialization processing (step 700), the types of input events to be processed therein are defined and the transmission of the defined input events is solicited (step 701), and then the communication from the communication relay program 31 transmitting the input event or the reply data is awaited (step 702). The types of input events solicited by the application program 24 is represented by the input event mask D1 in a form of the bit vector as shown in FIG. 5.

At the communication relay program 31, after awaiting for the communication from the window server program 21 or the application program 24 (step 710), the input event solicitation in a form of the input event mask D1 is received from the application program 24 (step 711). Then, the communication relay program 31 takes the OR of the bit vector of the received input event mask D1 and the bit vector of the input event mask D2 solicited by itself to obtain the input event mask D3 as indicated in FIG. 5 described above, and the obtained input event mask D3 is transmitted to the window server program 21 (step 712). By this, the types of input events solicited by the application program 24 and the communication relay program 31 are defined and notified to the window server program 21. Then, the communication relay program 31 stores the bit vectors of the input event masks D1 and D2 for the sake of the subsequent processing (step 713), and the operation returns to the step 710.

At the window server program 21, after awaiting for the communication from the communication relay program 31 and the input from the input device (step 720), the input event mask D3 is received from the communication relay program 31, and the bit vector of this input event mask D3 defining the types of input events to be transmitted is stored (step 721), such that whether or not to transmit the input event for the input subsequently received from the input device 1 is determined according to this stored bit vector, and then the operation returns to the step 720.

FIG. 8 is a flow chart of the input event processing operation when there is an input from the input device 1 to the window server program 21.

In this case, at the window program 21, after awaiting for the communication from the communication relay program 31 and the input from the input device (step 820), when there is an input from the input device 1 (step 821), this input is processed as the input event (step 822) and the matching is made with the bit vector stored at the step 721 of FIG. 7 (step 823) to determine whether it is the input event to be transmitted, and only when it is the input event solicited by the application program 24 or the communication relay program 31 (step 824), this input event is transmitted to the communication relay program 31 (step 825), and the operation returns to the step 820.

At the communication relay program 31, after awaiting for the communication from the window server program 21 or the application program 24 (step 810), when there is an input event transmitted from the window server program 21 (step 811), this input event is received (step 812). Here, in an exemplary case in which the communication relay program 31 adds the function for superposing the drawings specified by the mouse movements on the window display of the application program 24, the communication relay program 31 has two modes including a mode for relaying the received input event to the application program 24 as it is, and a mode for processing the received input event at the communication relay program 31 itself.

Thus, the communication relay program 31 next determines whether it is the mode for relaying the received input event to the application program 24 as it is or not (step 813), and if it is, the matching is made with the bit vector of the input event mask D1 stored at the step 713 of FIG. 7 (step 814) to determine whether it is the input event solicited by the application program 24 or not, and only when it matches with the bit vector of the input event mask D1, this input event is transmitted to the application program 24 (step 815) and then the operation returns to the step 810. On the other hand, if it is the mode for processing the input event at the communication relay program 31 itself, the matching is made with the bit vector of the input event mask D2 stored at the step 713 of FIG. 7 (step 816) to determine whether it is the input event solicited by the communication relay program 31 or not, and only when it matches with the bit vector of the input event mask D2, the processing according to this input event is carried out at the input event processing means 33 (step 817), and then the operation returns to the step 810.

In this example, the ID of the window produced by the application program 24 is stored by the communication relay program 31, and the input event processing means 33 superposes the drawings according to the mouse movement events through the output request processing means 34 on the window identified by the stored ID, such that the drawings are superposed on the window display of the application program 24.

At the application program 24, after awaiting for the input event or the reply data (step 800), when there is an input event transmitted from the communication relay program 81, this input event is received (step 801), and the processing according to this input event is carried out (step 802). Then, the output request is transmitted whenever necessary (step 808), and the operation returns to the step 800.

Figure 9:
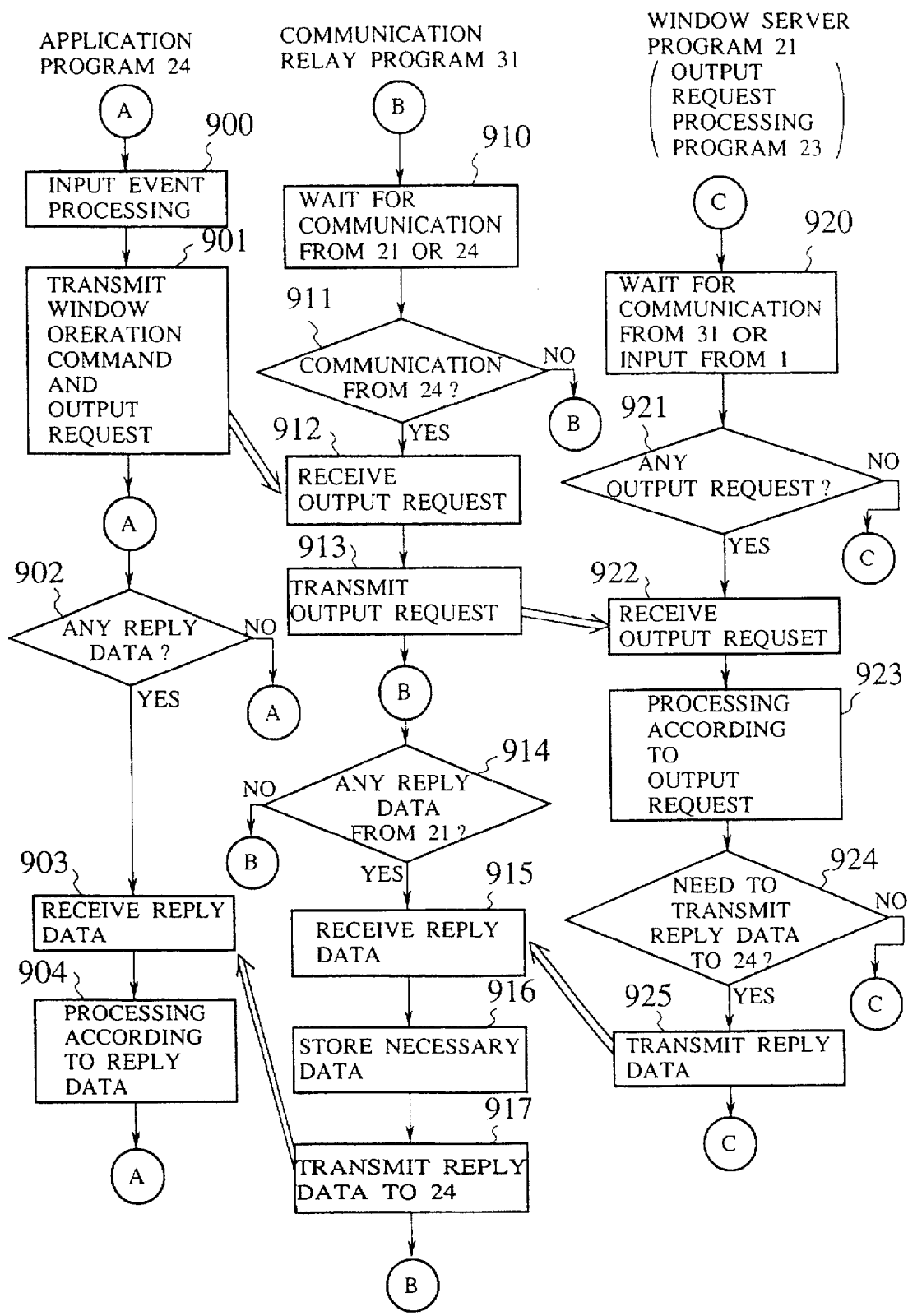
FIG. 9 is a flow chart of a output request processing operation in the system of FIG. 3.

FIG. 9 is a flow chart of the output request processing operation when there is an output request from the application program 24. Here, the output request not just requests the display of the drawings but also the production of the window and the inquiry of the present mouse position. This operation requires either a uni-directional communication from the application program 24 to the window server program 21, or a bi-directional communication incorporating a return of the reply data from the window server program 21 to the application program 24.

At the application program 24, the input event processing is carried out (step 900) and the resulting window operation command and the output request are transmitted to the communication relay program 31. Then, the operation returns to the step 900 in a case of using the uni-directional communication. In a case of using the bi-directional communication, when there is a reply data transmitted from the window server program 21 (step 902), this reply data is received asynchronously (step 903), and the processing according to the receive reply data is carried out (step 904), and then the operation returns to the step 900.

At the communication relay program 31, after awaiting for the communication from the window server program 21 or the application program 24 (step 910), when there is a communication from the application program (step 911), the output request transmitted by this communication is received (step 912), and the received output request is relayed to the window server program 21 (step 913) while copying the necessary data in the received output request. Then, the operation returns to the step 910 in a case of using the uni-directional communication. In a case of using the bi-directional communication, when there is a reply data transmitted from the window server program 21 (step 914), this reply data is received asynchronously (step 915), and the necessary data is copied from the reply data and stored (step 916). Here, for example, the ID of the window produced by the application program 24 which is to be utilized at the step 817 in FIG. 8 is stored. Then, the reply data is relayed to the application program 24 (917), and the operation returns to the step 910.

At the window server program 21, after awaiting for the communication from the communication relay program 31 and the input from the input device (step 920), when there is an output request transmitted from the communication relay program 31 (step 921), this output request is received (step 922), and the processing according to the received output request such as the production, operation, displaying, and drawing with respect to the window is carried out (step 923). In a case it is necessary to transmit the reply data to the application program 24 by using the bi-directional communication (step 924), the reply data is transmitted to the communication relay program 31 (step 925), and the operation returns to the step 920.

It is to be noted that, in the operation of FIG. 8 described above, the step 814 has been provided in order for the communication relay program 31 to not to relay the input eventss not solicited by the application program 24, but this step may be omitted if desired, as the application program 24 does nothing with respect to the input events not solicited originally.

Figure 10:
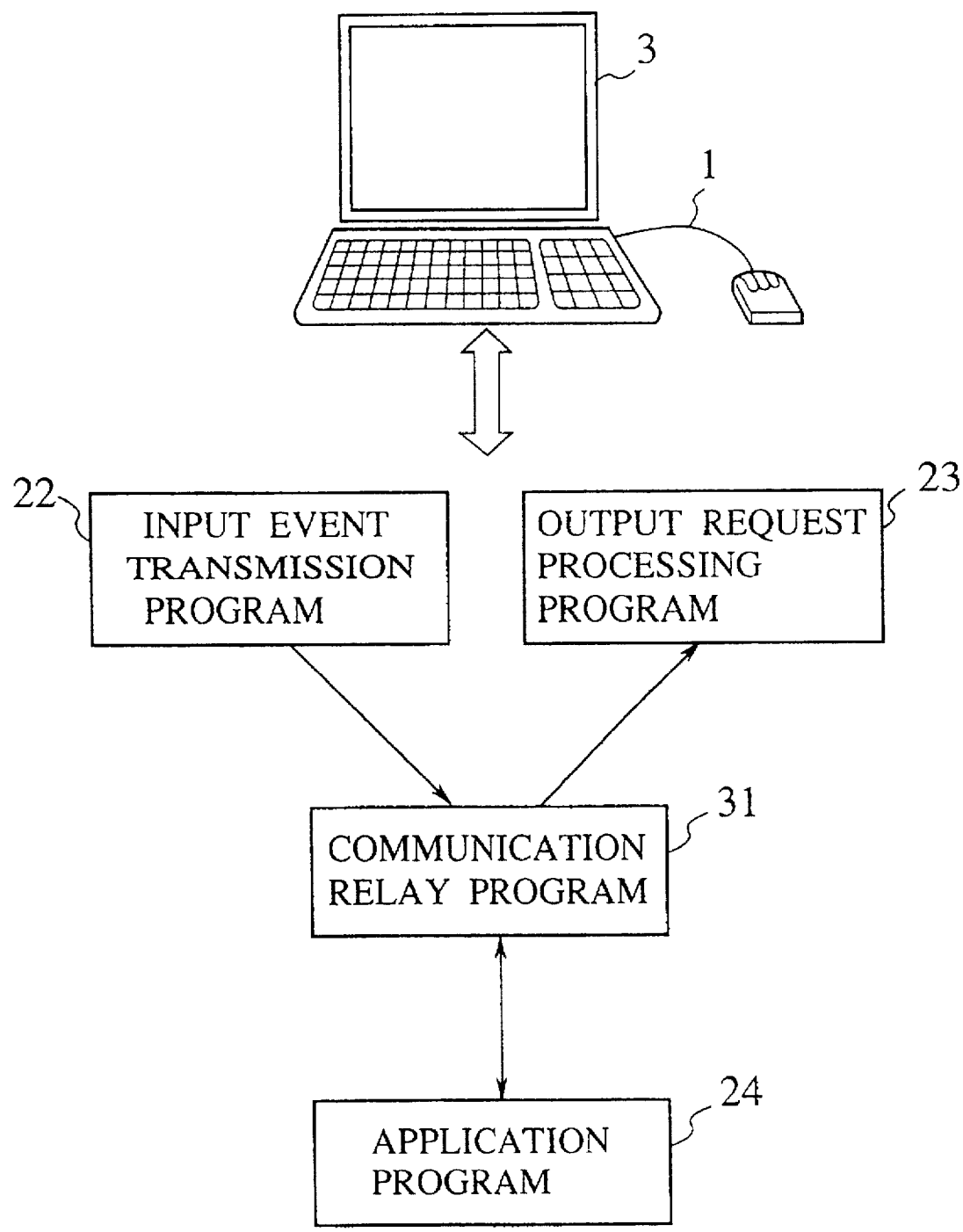
FIG. 10 is a diagram of one possible program configuration in the system of FIG. 3.

It is also to be noted that the above described first embodiment has been described for a case in which the window server program 21 including the input event transmission program 22 and the output request processing program 23 is operated as a single process, but it is also possible to provide the input event transmission program 22 and the output request processing program 23 as independent processes as indicated in FIG. 10.

Figure 11:
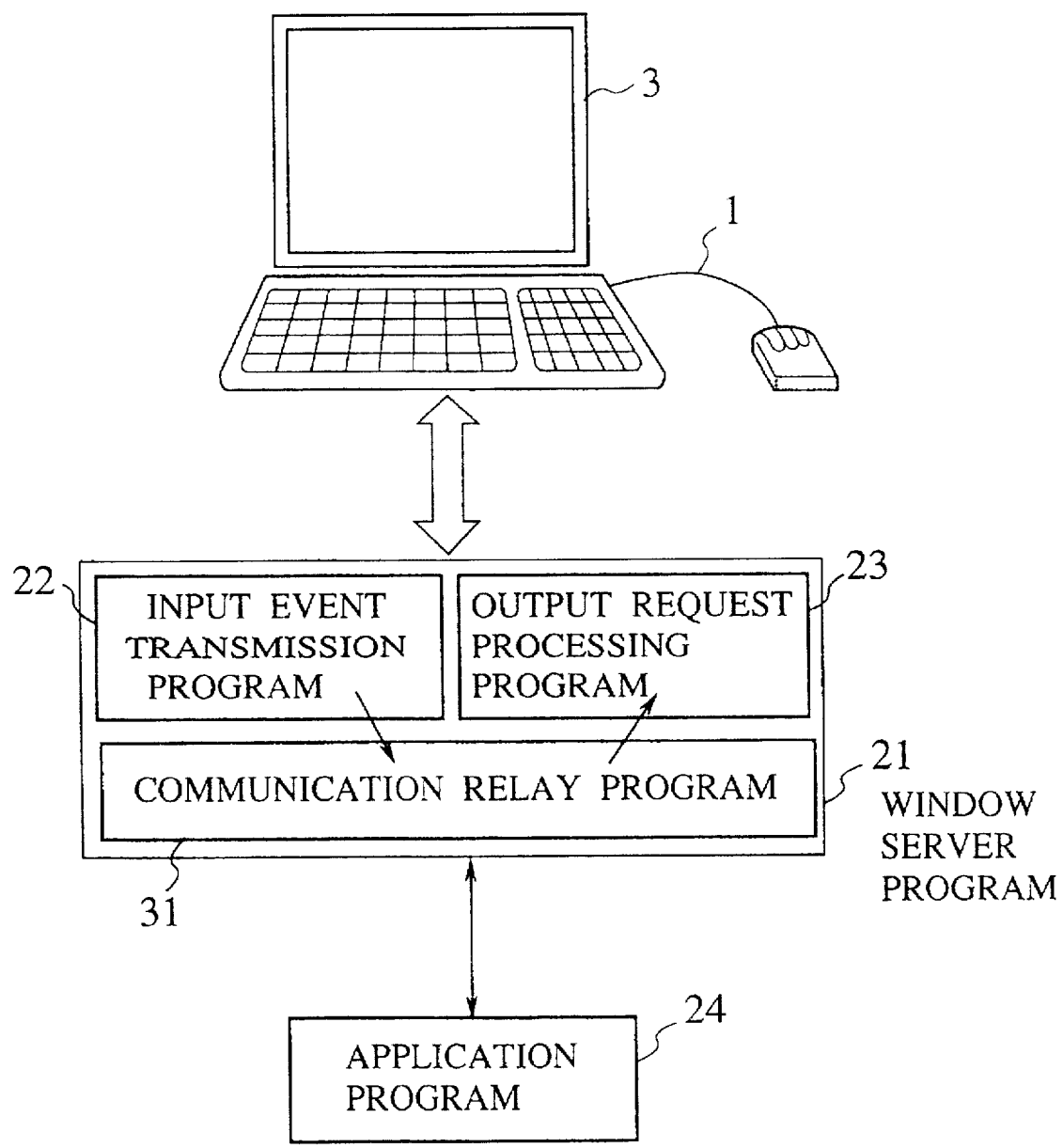
FIG. 11 is a diagram of another possible program configuration in the system of FIG. 3.
Figure 12:
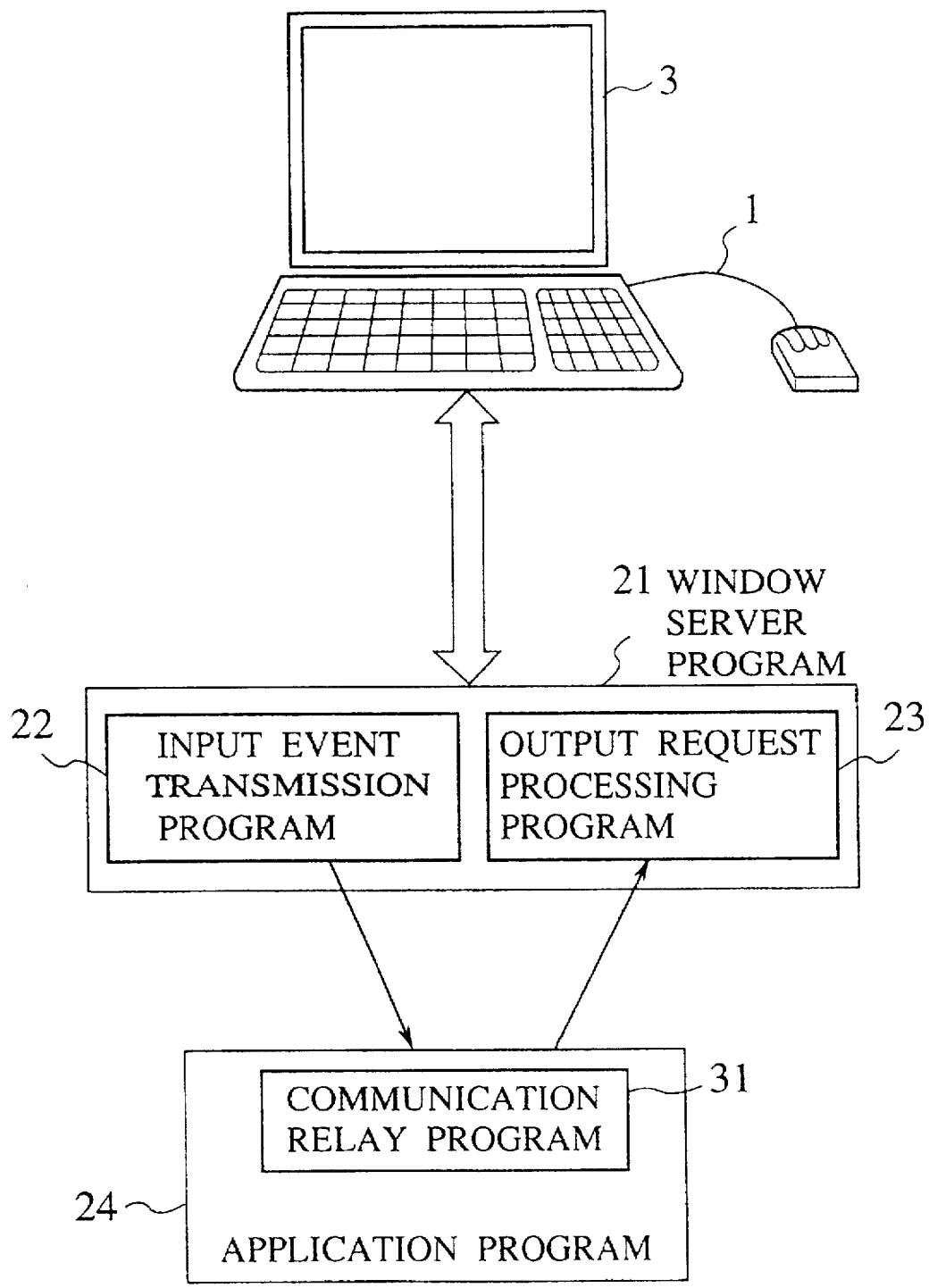
FIG. 12 is a diagram of still another possible program configuration in the system of FIG. 3.

Moreover, the above described first embodiment has been described for a case in which the window server program 21, the communication relay program 31, and the application program 24 are operated as independent processes, but the communication relay program 31 may be integrally incorporated within the window server program 21 as indicated in FIG. 11, or within the application program 24 as indicated in FIG. 12.

Figure 13:
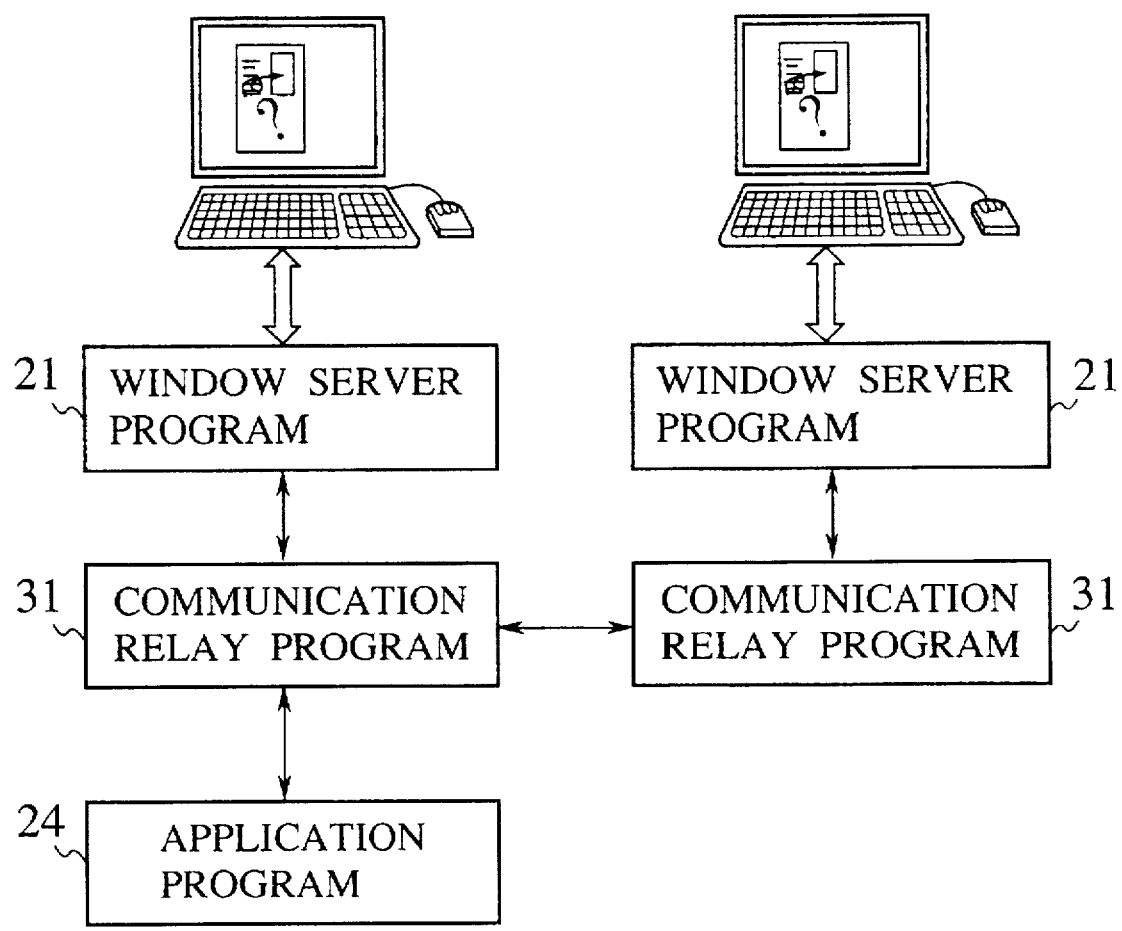
FIG. 13 is a diagram of one possible application of the system of FIG. 3.

Furthermore, it is also possible to apply the above described first embodiment of the present invention to a plurality of terminal devices simultaneously as indicated in FIG. 13, in order to assist the cooperative work by a plurality of users. In FIG. 13, the communication relay programs 31 provided in correspondence to the terminal devices are connected with each other and the application program 24 is communicated through one communication relay program 31, such that the output requests from the application program 24 are distributed to all the terminal devices to share the same window display among the terminal devices while the input events from the terminal devices are supplied together to the application program 24 to enable the operations from the terminal devices. In this case, the operation for superposing on the window display can also be distributed among the terminal devices to enable the addition of the functions such as the remote writing or the remote pointing.

Figure 14:
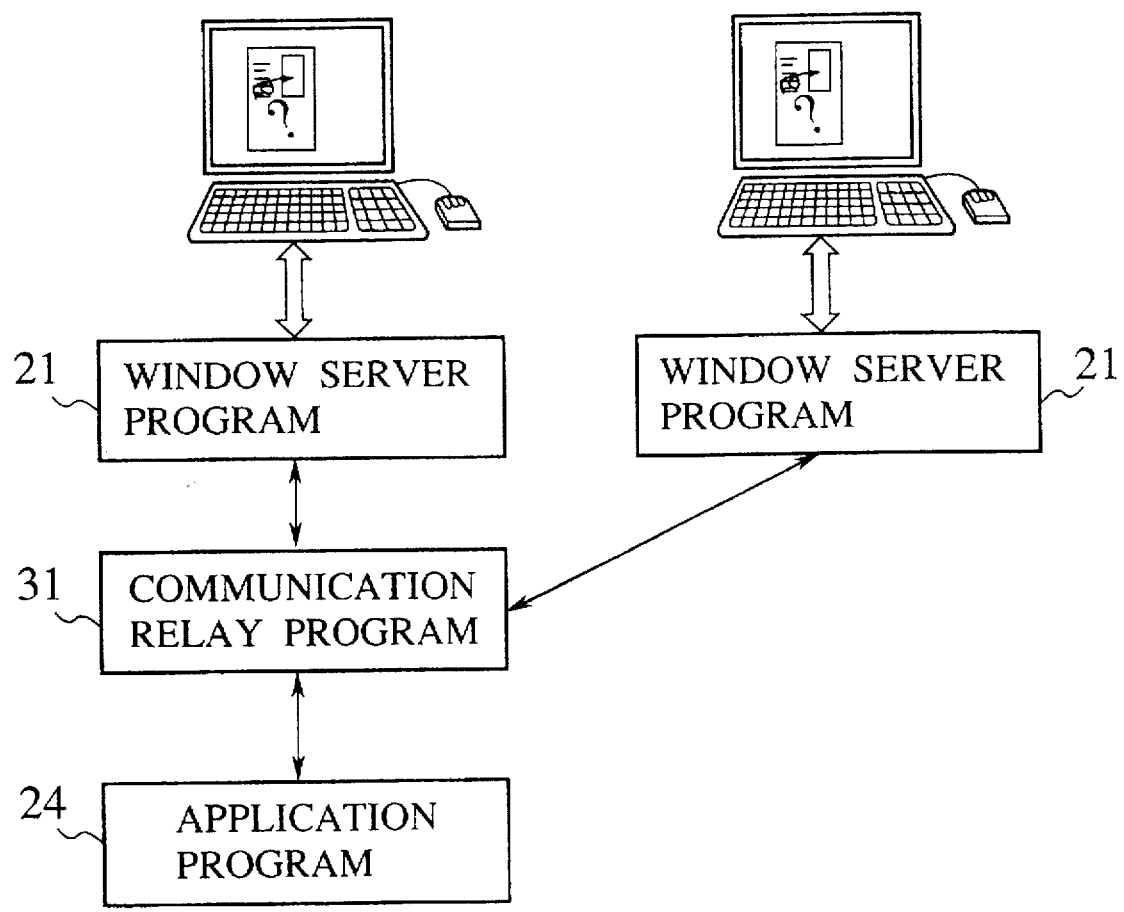
FIG. 14 is a diagram of another possible application of the system of FIG. 3.

In this manner, it becomes possible to support the smooth cooperative work even among the distanced terminal devices by sharing the same window display by using the additional functions of the remote writing or the remote pointing. Here, instead of providing the communication relay programs 31 in correspondence to the terminal devices, the single communication relay program 31 may be shared among the plurality of terminal devices through the plurality of window server programs 21 as indicated in FIG. 14.

Also, the first embodiment of the present invention has been described for a case of using the specific data structure called bit vector, but it is also possible to use any other suitable data structure having the equivalent functions such as those using the arrays or tables, in view of the execution speed or the memory capacity.

As described according to this first embodiment of the present invention, it is possible to provide a method and an apparatus for controlling a screen display capable of allowing the addition of new functions such as the note entry and the pointing according to the input events not solicited by the application program, while utilizing the abundant software resources already available without requiring the modification of the application program itself.

Next, the second embodiment of a system for controlling a screen display according to the present invention will be described in detail.

Figure 15:
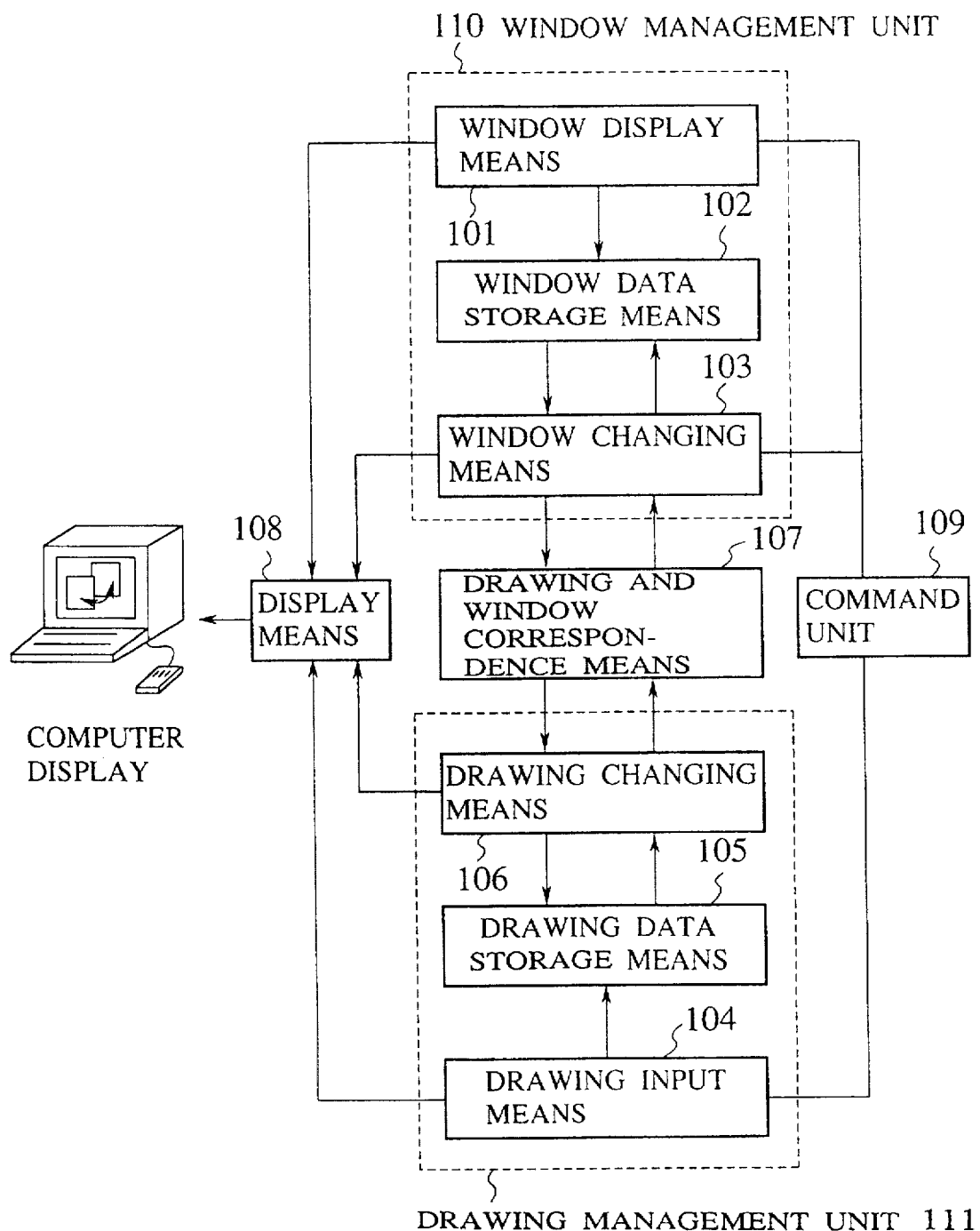
FIG. 15 is a block diagram of a second embodiment of a system for controlling a screen display according to the present invention.

Here, the system has an overall configuration as shown in FIG. 15, which comprises: a window management unit 110 including a window display means 101, a window data memory means 102, and a window changing means 103; a drawing management unit 111 including a drawing input means 104, a drawing data memory means 105, and a drawing changing means 106; a drawing window correspondence means 107; a display means 108; and a command unit 109.

The window display means 101 receives a window display request from a user or a program through a command unit 109, and outputs a display request to the display means 108. The window data memory means 102 stores window data concerning a position and a status of the window to be displayed obtained from the window display means 101, which is looked up by the window changing means 103. When there is a change in the window, the window data in the window data memory means 102 are also changed accordingly. The window changing means 103 receives the window display change request from a user or a program, and outputs a display request to the display means 108. In addition, when there is a change in the drawing made by the drawing changing means 106, this window changing means 103 searches out the related windows by looking up the drawing window correspondence means 107 and changes the related windows accordingly, while updating the window data in the window data memory means 102 according to the change made in the windows.

The drawing input means 4 receives a drawing input request from a user or a program, and outputs a display request to the display means 108. The drawing data memory means 105 stores drawing data concerning a position and a status of the drawing to be displayed obtained from the drawing input means 104, which is looked up by the drawing changing means 106. When there is a change in the drawing, the drawing data in the drawing data memory means 105 are also changed accordingly. When there is a change in the window made by the window changing means 103, the drawing changing means 106 searches out the related drawings by looking up the drawing window correspondence means 107 and changes the related drawings accordingly, while updating the drawing data in the drawing data memory means 105 according to the change made in the drawings.

The drawing window correspondence means 107 functions to search out the related windows of the drawings or the related drawings of the windows. The display means 108 displays new windows and drawings on a computer display, while controlling the displaying and deleting at a tie of making changes in the already displayed windows and drawings.

Figures 16, 17:
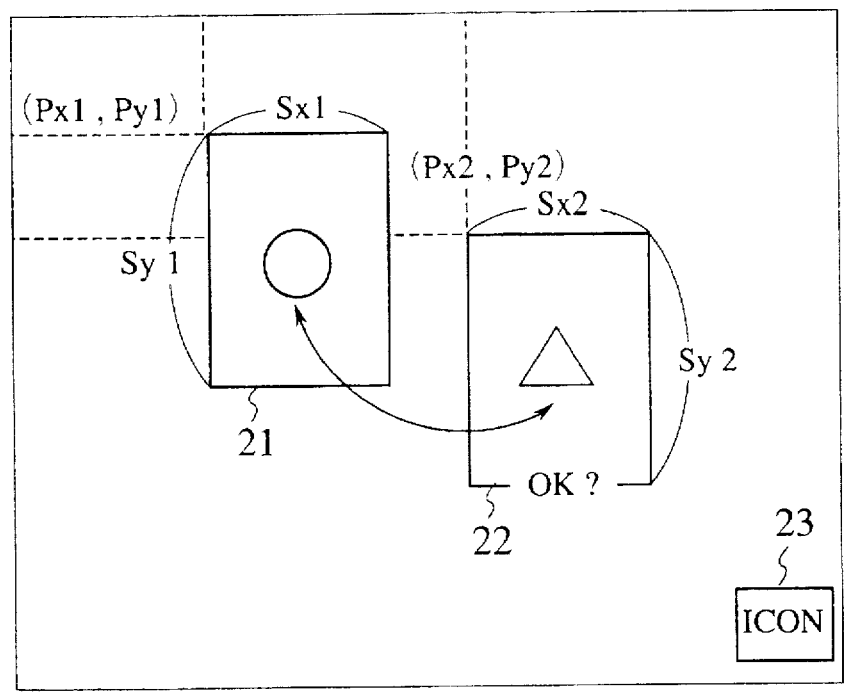
FIG. 16 is an illustration of an exemplary screen display in the system of FIG. 15.
FIG. 17 is a diagram of exemplary window data used in the system of FIG. 15 corresponding to the screen display of FIG. 16.

FIG. 16 shows an exemplary window display handled by this second embodiment in which the drawings are entered over the windows. Namely, FIG. 16 shows a case in which a user has written a freehand curve (arrow) for relating two displayed windows 21 and 22, and a character string "OK?" over one window 22. In addition, there is also a window 23 which is closed and iconized.

In this case, the window data memory means 102 stores the window data as shown in FIG. 17, where each entry includes fields for a window ID, a position, a size, an open/closed status, and related data for each window. Here, the windows 21, 22, and 23 shown in FIG. 16 are given the window IDs W1, W2, and W3, respectively. The position of each window is expressed by a coordinate of an upper left corner of a rectangular shape of each window such as (Px1, Py1), (Px2, Py2), and (Px3, Py3), respectively, while a size of each window is expressed by lengths of its sides such as (Sx1, Sy1), (Sx2, Sy2), and (Sx3, Sy3). The open/closed status indicates a status regarding whether each window is currently open or closed. In a case of FIG. 16, the windows W1 and W2 are open while the window W3 is closed. The related data field stores pointers to other data related to each window, which is utilized in recording the position and the size of an icon for a window which is closed and iconized.

Figure 18:
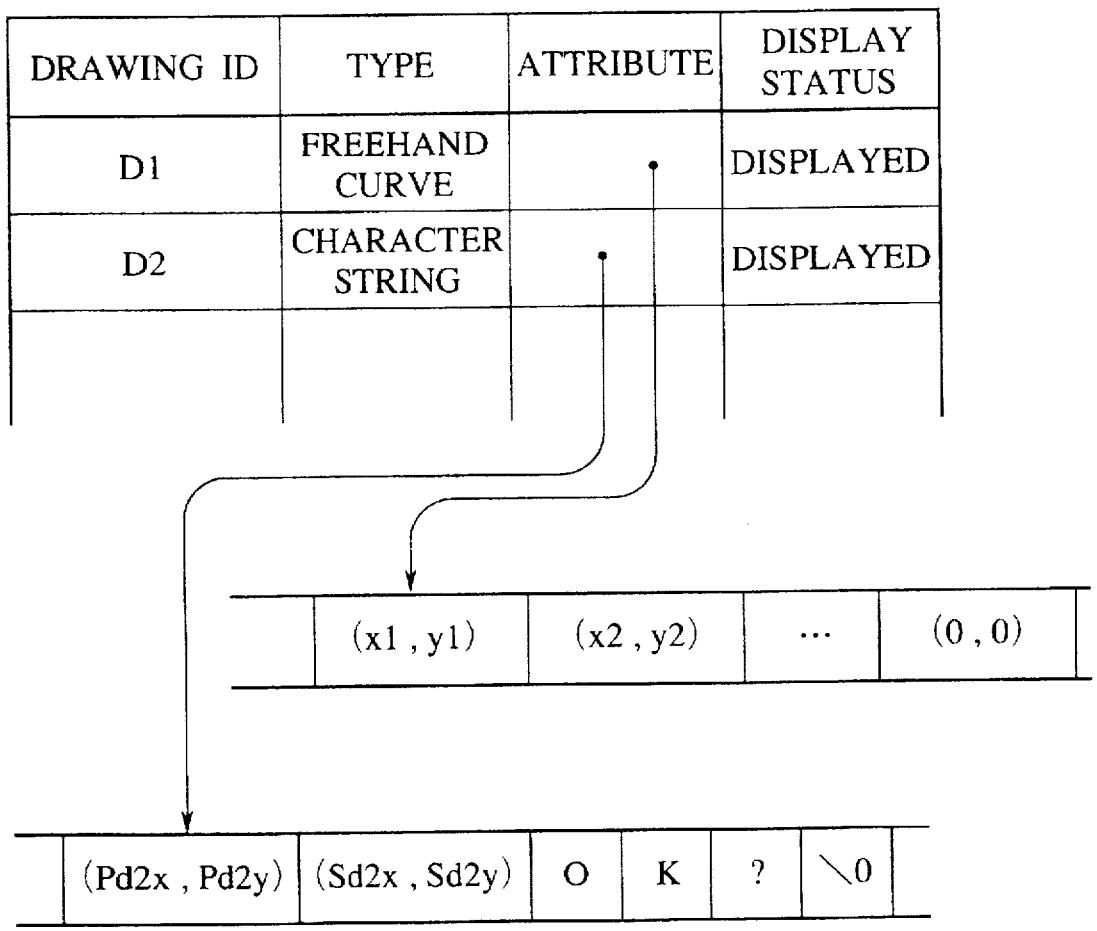
FIG. 18 is a diagram of exemplary drawing data used in the system of FIG. 15 corresponding to the screen display of FIG. 16.

On the other hand, the drawing data memory means 105 stores the drawing data as shown in FIG. 18, where each entry includes fields for a drawing ID, a type, an attribute, and a display status for each drawing entered by the user. Here, the two drawings (i.e., a freehand curve and a character string) shown in FIG. 16 are given the drawing IDs D1 and D2, respectively. The type of drawing indicates that the drawing D1 is a freehand curve while the drawing D2 is a character string. The content of the attribute field depends on the type of drawing. In a case of the freehand curve, it stores the point sequence of coordinates constituting the freehand curve, where a coordinate (0, 0) is used as a symbol indicating the end of the point sequence. In a case of the character string, it stores a starting position, size, and characters constituting the character string, where a character "\0" is used as a symbol indicating the end of the character string. The display status indicates whether each drawing is currently displayed on a screen, or deleted, or else changed. In FIG. 18, the drawings D1 and D2 are indicated to be currently displayed.

Figure 19:
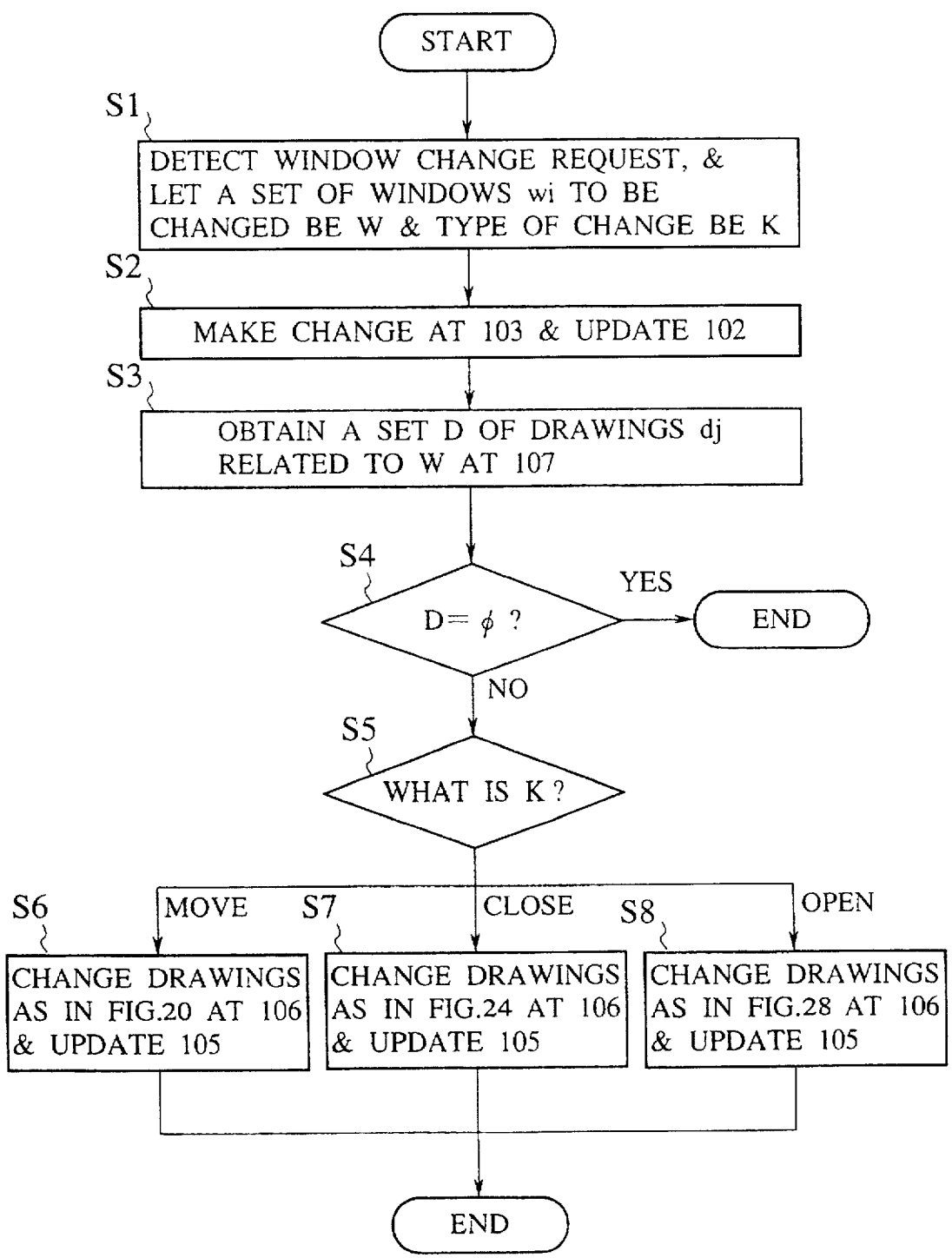
FIG. 19 is a flow chart of an overall operation in the system of FIG. 15.

In a case the window has changed, the operation according to the flow chart of FIG. 19 is carried out. Here, an exemplary case in which the window W1 shown in FIG. 16 has moved from a position (Px1, Py1) to (Px1', Py1') will be considered. This movement of the window W1 may be specified by the user or the program.

First, the window change request is detected and a set of the windows wi to be changed is expressed as W, while the type of change to be made in the windows wi of the set W is expressed as K by the drawing window correspondence means 107 (step S1). Here, the set W may contain only one element or a plurality of elements, and in the exemplary case considered here, it contains the window W1. Then, the window changing means 108 moves the window W1 of this set W and changes the position of the window W1 registered in the window data memory means 102 to a new position (Px1', Py1') (step S2). Next, a set D of the drawings dj related to the set W is obtained by the drawing window correspondence means 107 (step S8). This can be done by searching out the drawings dj which have regions common to the regions occupied by the windows wi of the set W.

Figure 20:
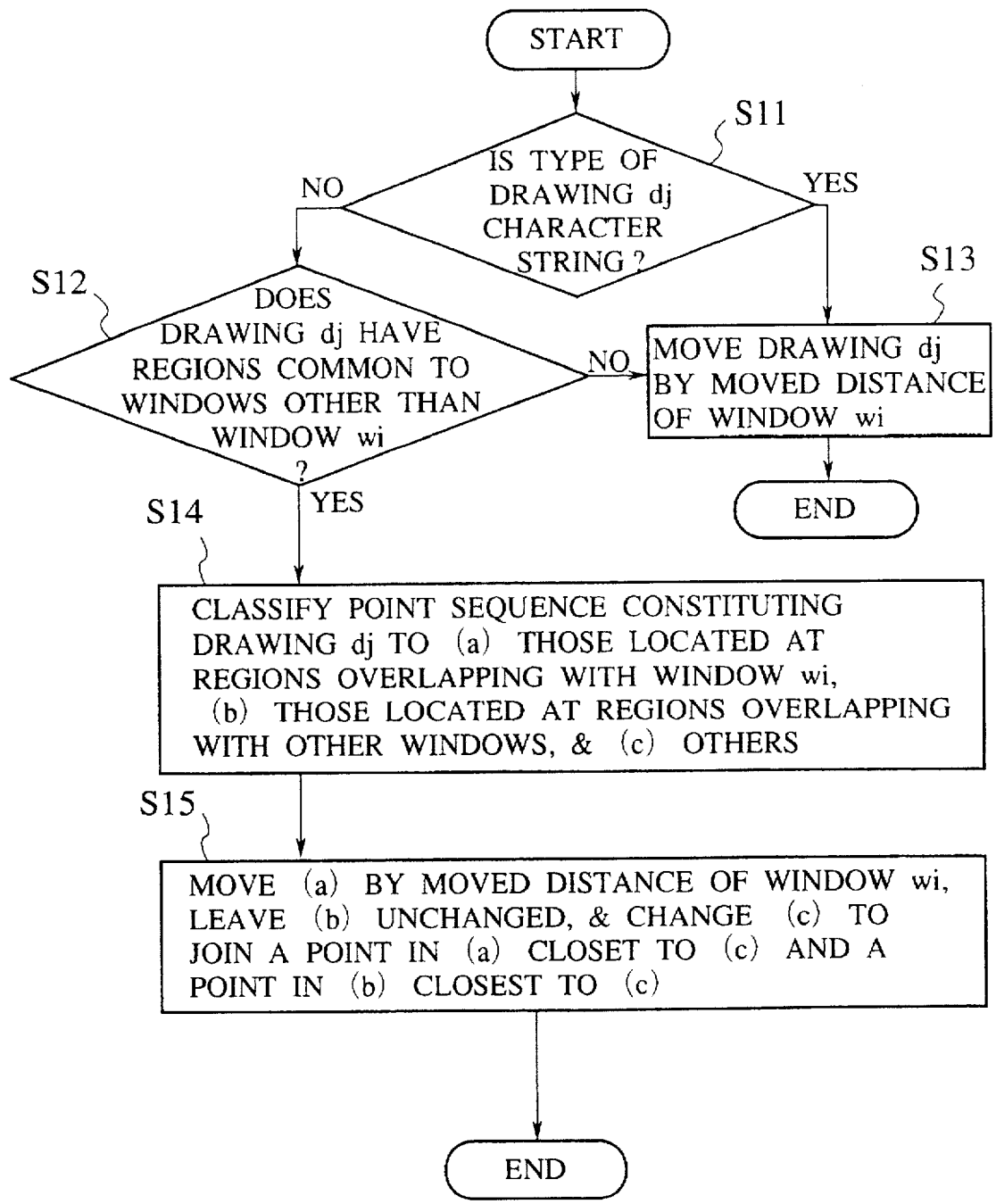
FIG. 20 is a flow chart of an operation at a drawing data changing means in the system of FIG. 15 in a case the change to be made is moving of a window.
Figure 24:
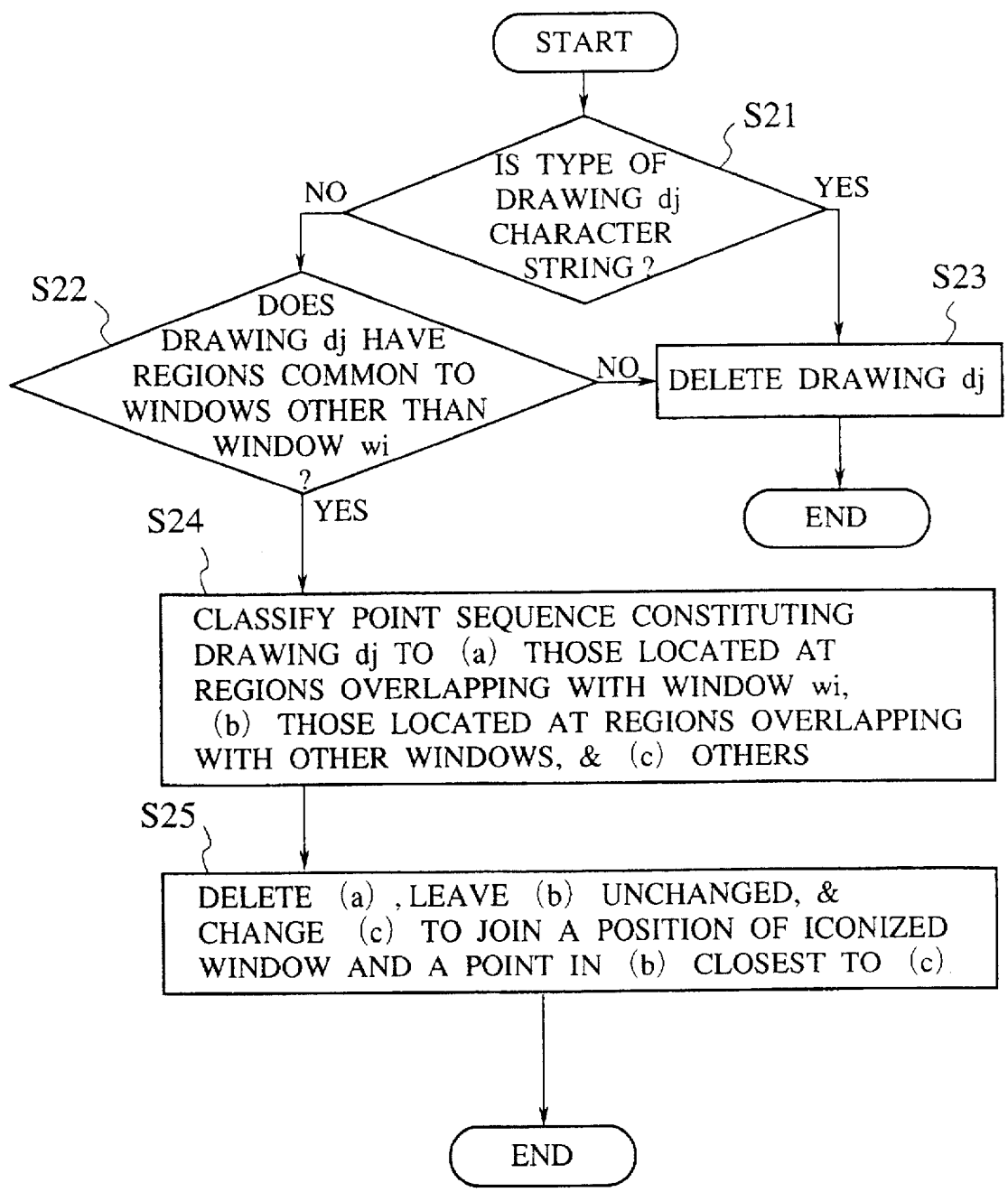
FIG. 24 is a flow chart of an operation at a drawing data changing means in the system of FIG. 15 in a case the change to be made is closing of a window.
Figure 28:
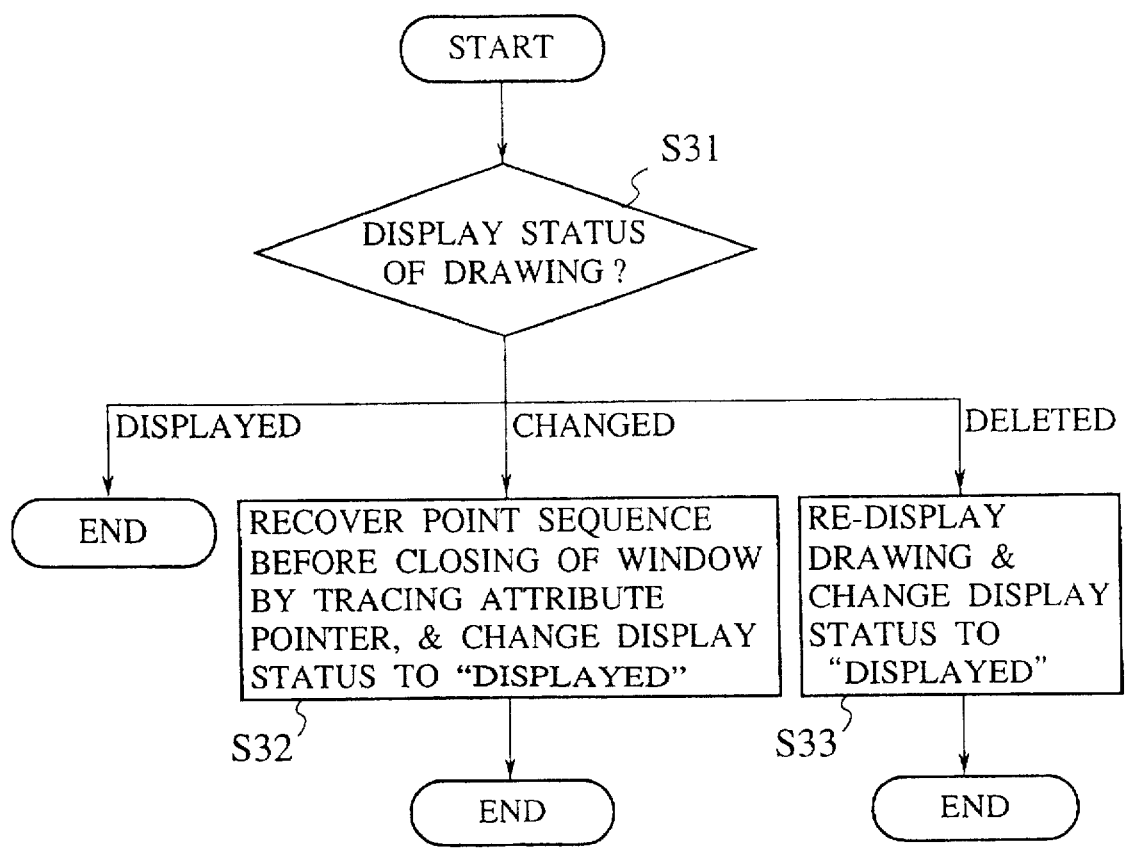
FIG. 28 is a flow chart of an operation at a drawing data changing means in the system of FIG. 15 in a case the change to be made opening of a window.

When the set D obtained at the step S3 is empty (φ) (step S4 yes), the operation is ended as there is no related drawings. Otherwise (step S4 no), the type of change indicated by K is determined (step S8), and the operation to change the drawings according to the type of change made in the windows wi of the set W is carried out by the drawing changing means 106. In a case the type of change is moving, the operation according to the flow chart of FIG. 20 is carried out with respect to each element of the set D and the drawing data in the drawing data memory means 105 are updated according to the result of the change. In a case the type of change is closing, the operation according to the flow chart of FIG. 24 is carried out with respect to each element of the set D and the drawing data in the drawing data memory means 105 are updated according to the result of the change. In a case the type of change is opening, the operation according to the flow chart of FIG. 28 is carried out with respect to each element of the set D and the drawing data in the drawing data memory means 105 are updated according to the result of the change. In this exemplary case considered here, D={D1}, so that the operation of FIG. 20 or 24 or 28 is applied to the drawing D1.

In a case of moving the window wi, the operation of FIG. 20 proceeds as follows. First, whether the type of drawing for the drawing dj is a character string or not is determined (step S11). If so, the drawing dj is simply moved for the same distance as the moved distance of the window wi (step S13). Otherwise, whether the drawing dj has regions common to the windows other than the window wi is determined (step S12). If not, the drawing dj is simply moved for the same distance as the moved distance of the window wi at the step S13. Otherwise, the points of the point sequence constituting the drawing dj are classified into three classes of (a) those located at regions overlapping with the window wi, (b) those located at regions overlapping with other windows, and (c) others (step S14). Then, the point of the class (a) is moved for the same distance as the moved distance of the window wi such that this point appears at the same location on the window wi as before the move is made, and the point of the class (b) is left unchanged as the other windows are not moved, while the point of the class (c) is re-arranged to join a point in the class (a) which is closest to the points of the class (c) and a point in the class (b) which is closest to the points of the class (c) (step S15).

Figures 21, 22:
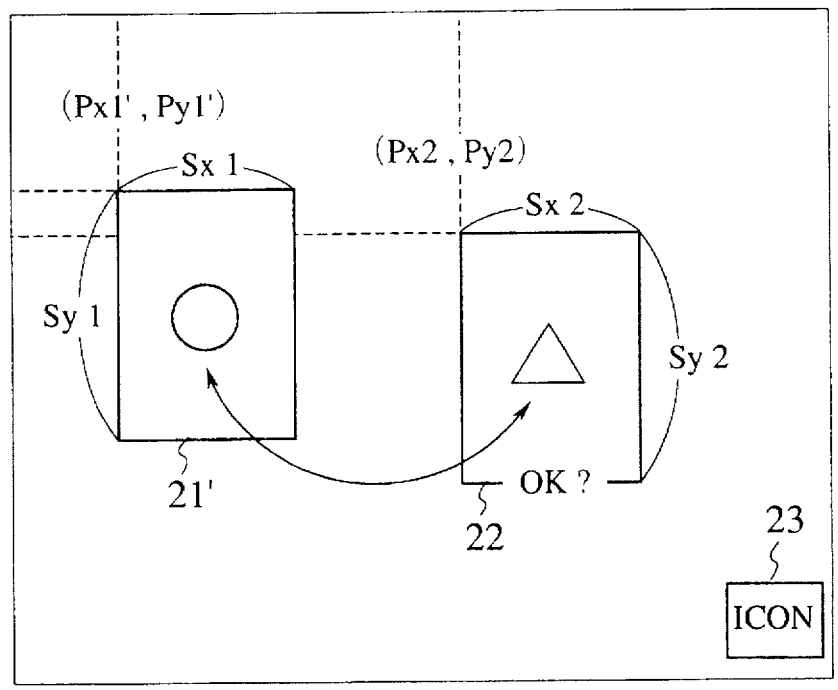
FIG. 21 is an illustration of an exemplary screen display in the system of FIG. 15 obtained from that of FIG. 16 by the operation of FIG. 20.
FIG. 22 is a diagram of exemplary window data used in the system of FIG. 15 obtained from that of FIG. 17 by the operation of FIG. 20.

FIG. 21 shows the window display obtained as a result of applying the operations of FIGS. 19 and 20 on the window display of FIG. 16. In FIG. 21, in accordance with the movement of the window W1 (21'), the points of the freehand curve within the window W1 are moved along with the window W1, while the points of the freehand curve within the other window W2 are unchanged, and the points of the freehand curve not contained in either window are re-arranged to join the freehand curve within the window W1 with the freehand curve within the window W2. Here, as for the points not contained in either window, their number may be changed in addition to their positions.

FIG. 22 shows the window data in the window data memory means 102 after the operations of FIGS. 19 and 20, where, as the window W1 has been moved, its position is changed to the new position (Px1', Py1').

Figure 23:
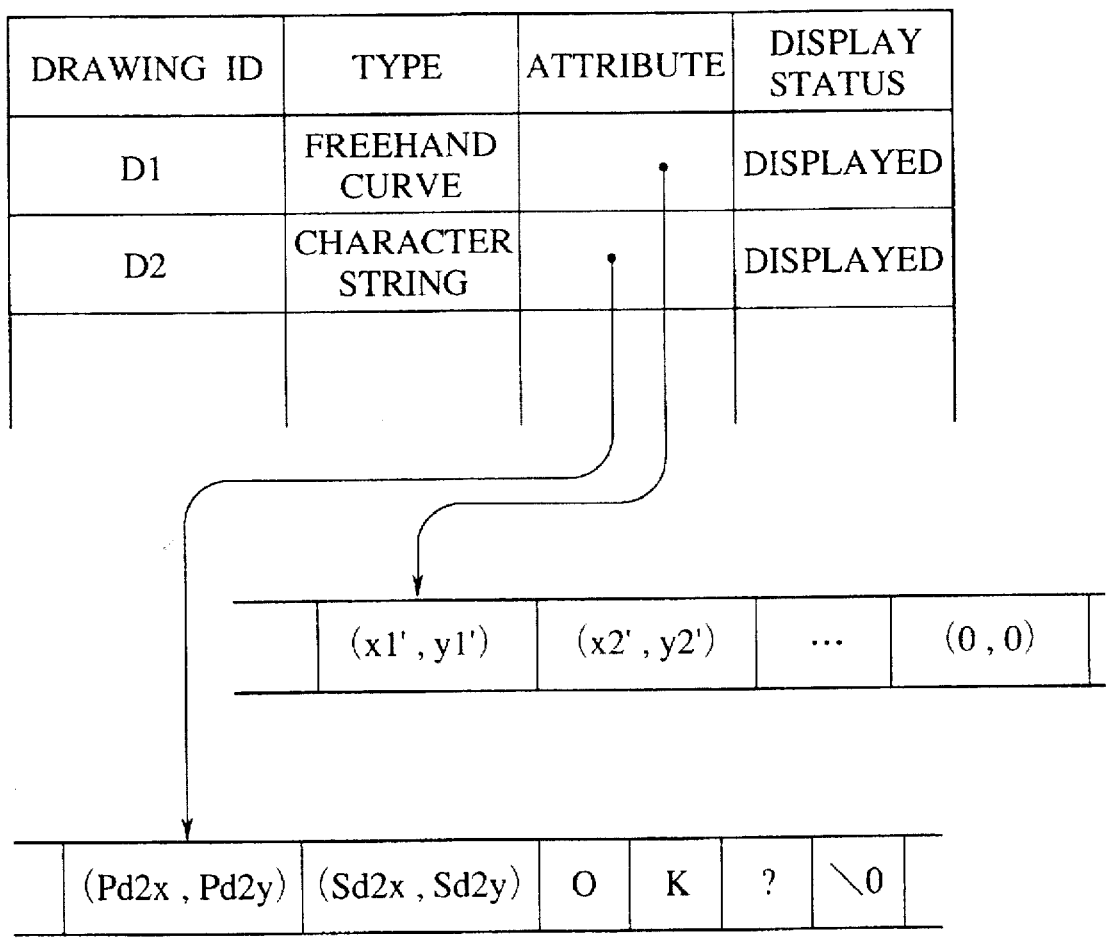
FIG. 23 is a diagram of exemplary drawing data used in the system of FIG. 15 obtained from that of FIG. 18 by the operation of FIG. 20.

FIG. 23 shows the drawing data in the drawing data memory means 105 after the operation of FIGS. 19 and 20, where, as the drawing D1 has been moved, the coordinates registered in its attribute field are changed to (x1', y1') and (x2', y2').

In a case of closing the window wi, the operation of FIG. 24 proceeds as follows. First, whether the type of drawing for the drawing dj is a character string or not is determined (step S21). If so, the drawing dj is simply deleted (step S23). Otherwise, whether the drawing dj has regions common to the windows other than the window wi is determined (step S22). If not, the drawing dj is simply deleted at the step S23. Otherwise, the points of the point sequence constituting the drawing dj are classified into three classes of (a) those located at regions overlapping with the window wi, (b) those located at regions overlapping with other windows, and (c) others (step S14). Then, the point of the class (a) is deleted as the window wi is closed, and the point of the class (b) is left unchanged as the other windows are not closed, while the point of the class (c) is re-arranged to join a point in the iconized window wi and a point in the class (b) which is closest to the points of the class (c) (step S25).

Figure 25:
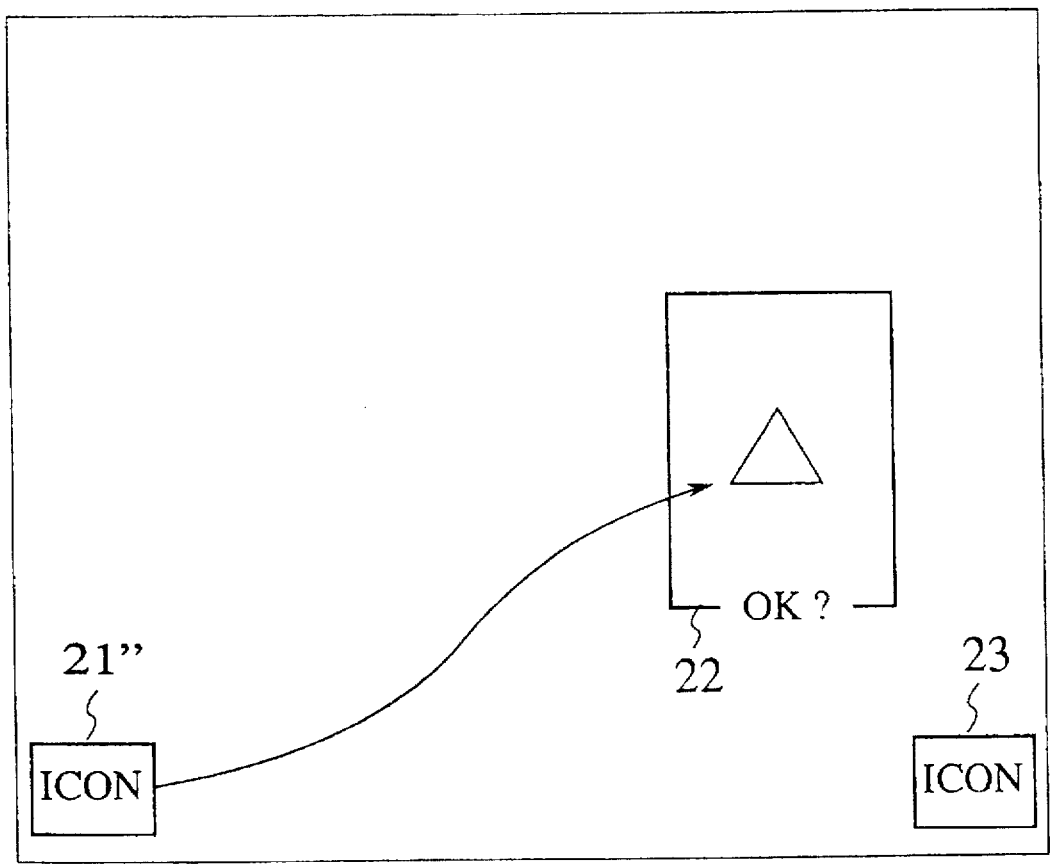
FIG. 25 is an illustration of an exemplary screen display in the system of FIG. 15 obtained from that of FIG. 16 by the operation of FIG. 24.

FIG. 25 shows the window display obtained as a result of applying the operations of FIGS. 19 and 24 on the window display of FIG. 16. In FIG. 24, as the window W1 is closed and iconized as icon 21" at the lower left corner, the points of the freehand curve within the window W1 are deleted, while the points of the freehand curve within the other window W2 are unchanged, and the points of the freehand curve not contained in either window are re-arranged to join the icon 21" of the window W1 with the freehand curve within the window W2. Here, as for the points not contained in either window, their number may be changed in addition to their positions.

Figure 26:
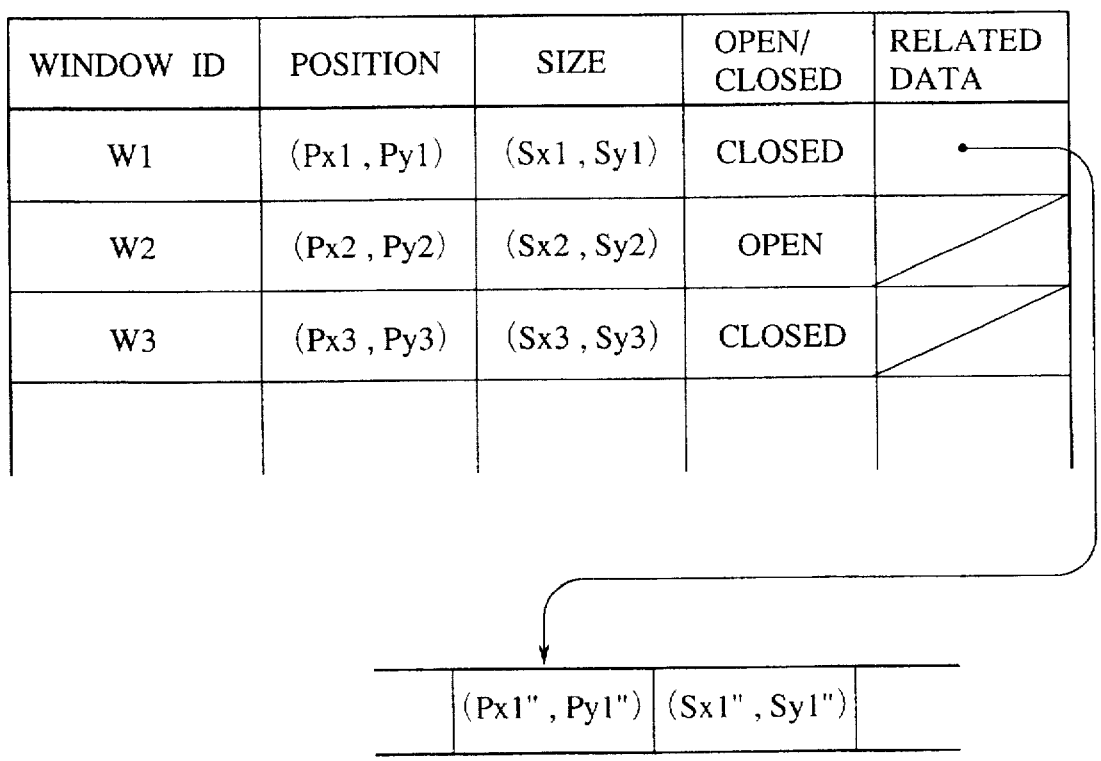
FIG. 26 is a diagram of exemplary window data used in the system of FIG. 15 obtained from that of FIG. 17 by the operation of FIG. 24.

FIG. 26 shows the window data in the window data memory means 102 after the operations of FIGS. 19 and 24, where, as the window W1 has been closed, its open/closed status is changed to "closed", while a pointer to the position (Px1, Py2") and the size (Sx1", Sy1") is registered in its related data field. Here, the original position and size of the window WI in the position and size fields are retained as it is possible for this closed window W1 to be re-opened later on, in contrast to the above described case of moving in which case the original position and size of the window W1 can be changed as there is no command requiring this window W1 to resume its original position and size.

Figure 27:
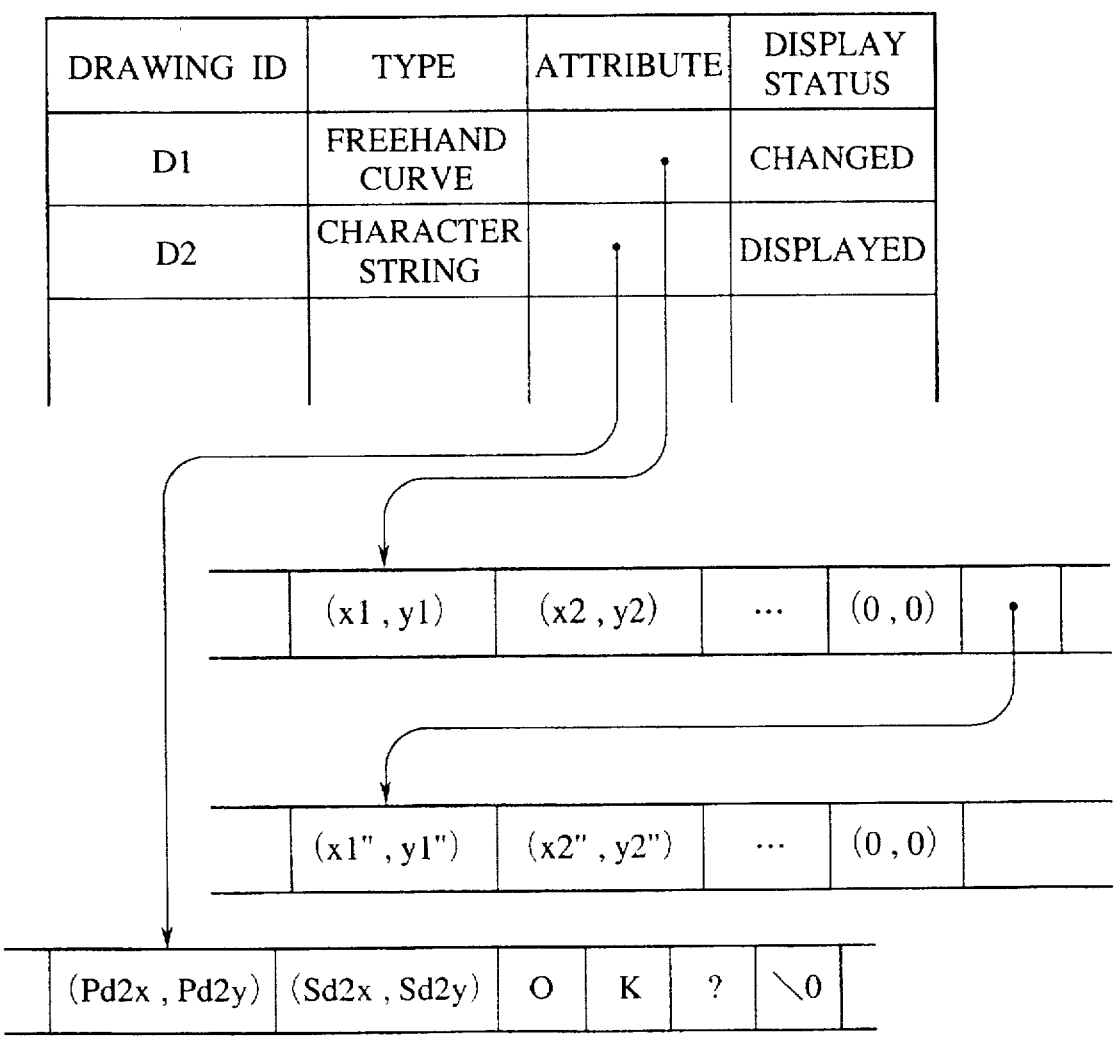
FIG. 27 is a diagram of exemplary drawing data used in the system of FIG. 15 obtained from that of FIG. 18 by the operation of FIG. 24.

FIG. 27 shows the drawing data in the drawing data memory means 105 after the operation of FIGS. 19 and 24, where, as the drawing D1 has been changed, its display status is changed to "changed". In addition, the coordinates of the points in the point sequence newly generated by the operation of FIG. 24 are also registered in its attribute field in addition to the coordinates of the points in the original point sequence, as it is possible for this drawing dj to resume its original form when the closed window W1 is re-opened later on, in contrast to the above described case of moving the window in which case the coordinates of the original point sequence can be changed as there is no command requiring this drawing dj to resume its original form.

In a case of opening the window wi, that is, a case of re-opening the closed window, the operation of FIG. 28 proceeds as follows. Namely, first, the display status of the drawing is determined (step S31), and when it is "displayed", no operation is made. When it is "changed", the point sequence before the closing of the window is recovered by tracing the pointers registered in the attribute field to resume the original form of the drawing, and the display status is changed to "displayed" (step S32). When it is "deleted", the drawing is re-displayed and the display status is changed to "displayed" (step S33).

Figure 29A:
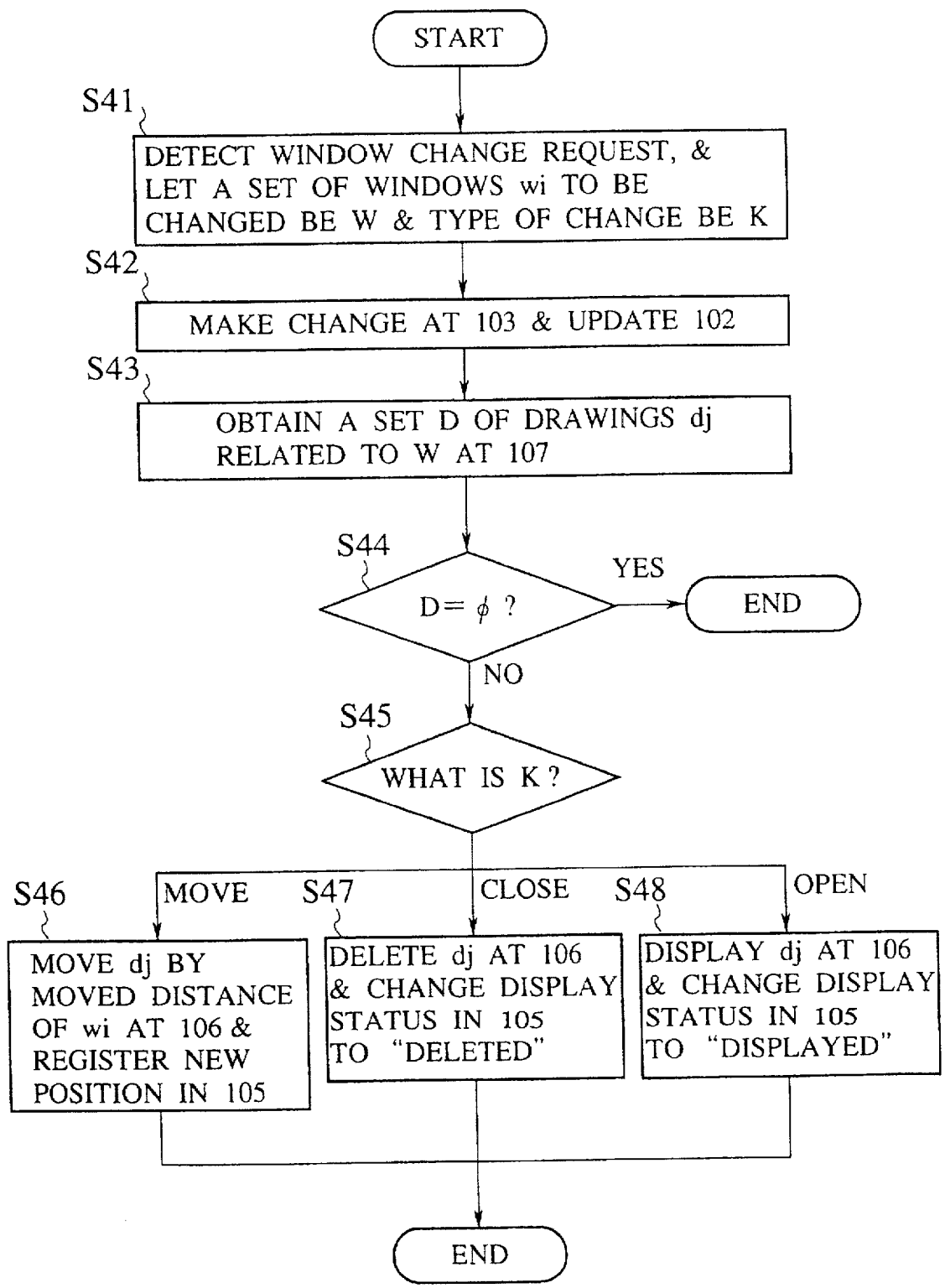
FIGS. 29A and 29B are a flow chart of an alternative overall operation in the system of FIG. 15.
Figure 29B:
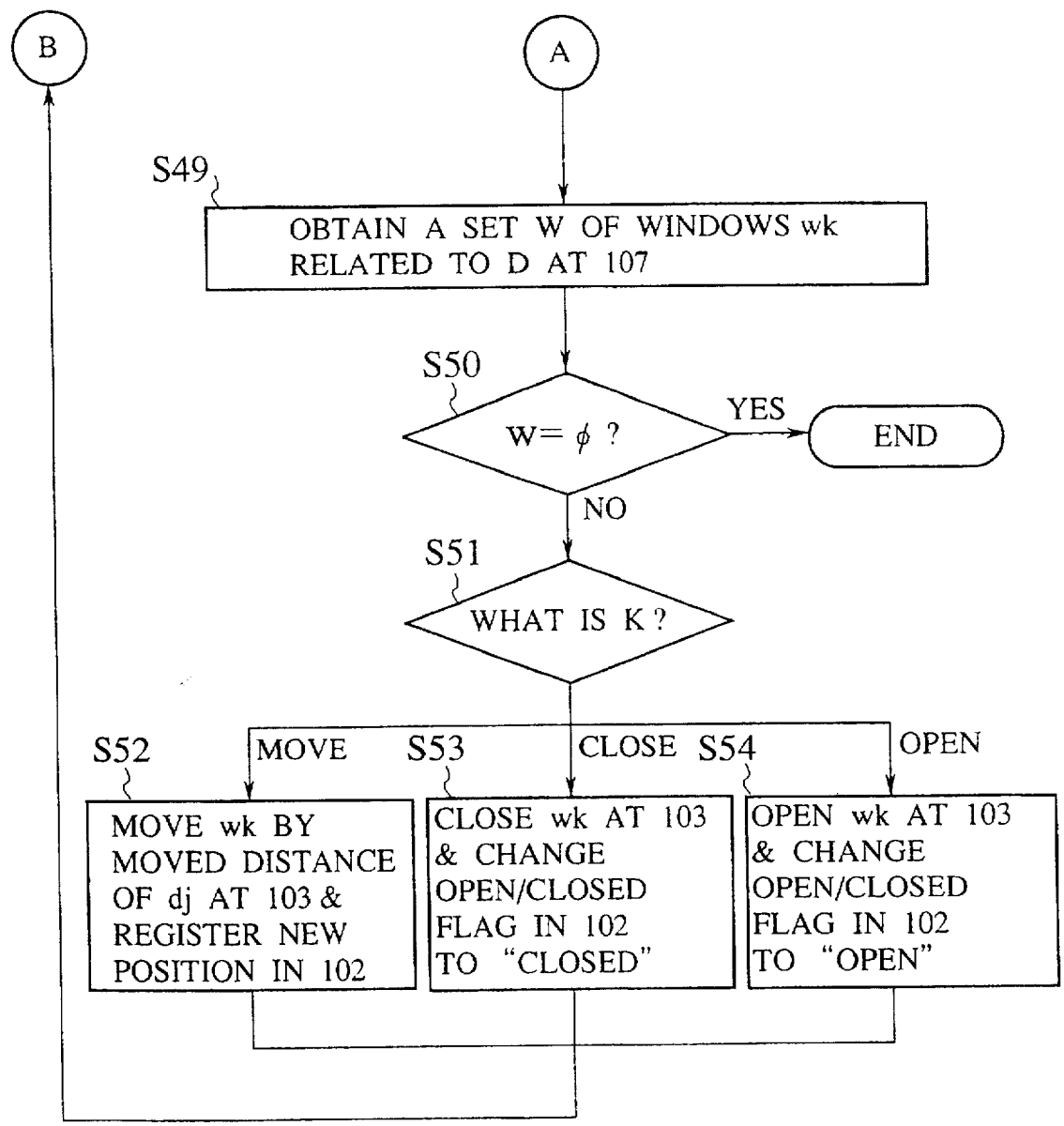

Alternatively, in a case the window has changed, the operation according to the flow chart of FIGS. 29A and 29B may be carried out instead. Here, the same exemplary case in which the window W1 shown in FIG. 16 has moved from a position (Px1, Py1) to (Px1', Py1') will be considered as before. This movement of the window W1 may be specified by the user or the program.

First, the window change request is detected and a set of the windows wi to be changed is expressed as W, while the type of change to be made in the windows wi of the set W is expressed as K by the drawing window correspondence means 107 (step S41). Here, the set W may contain only one element or a plurality of elements, and in the exemplary case considered here, it contains the window W1. Then, the window changing means 103 moves the window W1 of this set W and changes the position of the window W1 registered in the window data memory means 102 to a new position (Px1', Py1') (step S42). Next, a set D of the drawings dj related to the set W is obtained by the drawing window correspondence means 107 (step S43).

When the set D obtained at the step S3 is empty (φ) (step S44 yes), the operation is ended as there is no related drawings. Otherwise (step S44 no), the type of change indicated by K is determined (step S45), and the operation to change the drawings according to the type of change made in the windows wi of the set W is carried out by the drawing changing means 106.

Here, in a case the type of change is closing of the window wi, the drawing dj related to this window wi is deleted and the other windows related to this drawing d3 are closed because the drawing d3 related to the closed window wi or the other windows do not make sense when the window wi is closed, and then the window data in the window data memory means 102 and the drawing data in the drawing data memory means 105 are updated according to the result of the change such that the display status of the drawing dj in the drawing data memory means 105 is changed to "deleted" (step S47).

Also, in a case the type of change is opening of the window wi, the drawing d3 related to this window wi are re-displayed and the other windows related to this drawing dj are re-opened, and then the window data in the window data memory means 102 and the drawing data in the drawing data memory means 105 are updated according to the result of the change such that the display status of the drawing dj in the drawing data memory means 105 is changed to "displayed" (step S48).

On the other hand, in a case the type of change is moving of the window wi, each element of the set D is moved for the same distance as the moved distance of the window wi, that is for (δx, δy) where δx=Px1'−Px1, and δy=Py1'−Py1. In this exemplary case considered here, D={D1}, and the drawing data in the drawing data memory means 105 are updated by adding the (δx, δy) to each coordinate registered as the attribute of the drawing D1 in the drawing data memory means 105 (step S46).

Next, as the drawing dj of the set D related to the window W1 has been changed, there is a need to make changes also in the windows related to this drawing dj.

To this end, a set of the windows wk related to the drawing dj of the set D is expressed as W by the drawing window correspondence means 107 (step S49). Here, in the exemplary case considered here, W={W2}.

When the set W obtained at the step S49 is empty (φ) (step S50 yes), the operation is ended as there is no related drawings. Otherwise (step S50 no), the type of change indicated by K is determined (step S51), and the operation to change the windows according to the type of change made in the drawing dj of the set D is carried out by the window changing means 103.

Namely, in a case the type of change is closing of the window wi, the window wk related to the drawing dj is closed, and the window data in the window data memory means 102 are updated according to the result of the change such that the open/closed status of the window wk in the window data memory means 102 is changed to "closed" (step S53).

Also, in a case the type of change is opening of the window wi, the window wk related to the drawing dj is re-opened, and the window data in the window data memory means 102 are updated according to the result of the change such that the open/closed status of the window wk in the window data memory means 102 is changed to "open" (step S54).

On the other hand, in a case the type of change is moving of the window wi, each element of the set W is moved for the same distance as the moved distance of the drawing dj, that is for ($\delta x, \delta y$), and the window data in the window data memory means 102 are updated by adding the ($\delta x, \delta y$) to the position of the window wk in the window data memory means 102 (step S52).

Also, as the window wk of the set W related to the drawing dj has been changed, there is a need to make changes also in the drawings related to this window wk, so that the operation returns to the step S43 described above and thereafter the steps S44 to S54 are repeated. In the exemplary case considered here, D={D2}, so that the drawing D2 is moved for the same distance as the moved distance of the window wi, that is for ($\delta x, \delta y$), and the drawing data in the drawing data memory means 105 are updated by adding the ($\delta x, \delta y$) to the starting position registered as the attribute of the drawing D2 in the drawing data memory means 105. After that, W=$\phi$ in this exemplary case considered here, so that the operation is ended.

Figures 30, 31:
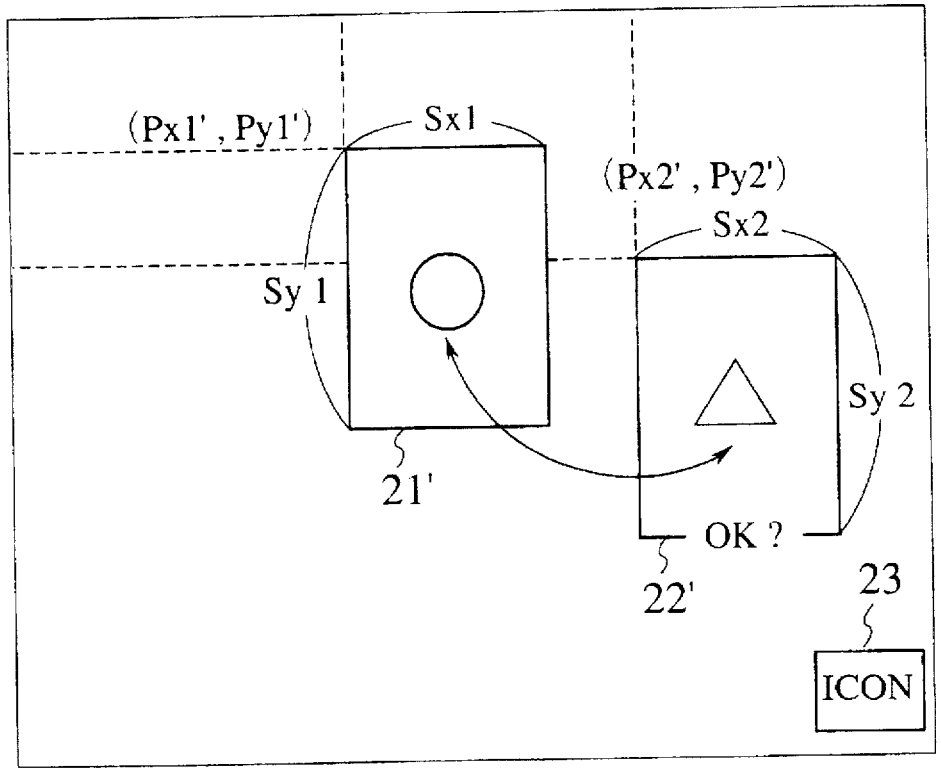
FIG. 30 is an illustration of an exemplary screen display in the system of FIG. 15 obtained from that of FIG. 16 by the operation of FIGS. 29A and 29B.
FIG. 31 is a diagram of exemplary window data used in the system of FIG. 15 obtained from that of FIG. 17 by the operation of FIGS. 29A and 29B.

FIG. 30 shows the window display obtained as a result of applying the operations of FIGS. 29A and 29B on the window display of FIG. 16. In FIG. 30, in accordance with the movement of the window W1 (21'), the drawing D1 of the freehand curve related to this window W1 is moved along the window W1, while the the window W2 (22') related to the drawing D1 is also moved along the drawing D1, and the drawing D2 of the character string related to this window W2 is moved along the window W2. Here, the moved distance of the drawing D1, the window W2, and the drawing D2 is equal to the moved distance of the window W1, so that relative positions of the drawings D1 and D2 with respect to the windows W1 and W2 are preserved as before the move is made. Meanwhile, the iconized window W3 (23) is unrelated to the window W1 as well as to its related drawings and windows, so that it is left unchanged.

FIG. 31 shows the window data in the window data memory means 102 after the operations of FIGS. 29A and 29B, where, as the windows W1 and W2 have been moved, their positions are changed to the new position (Px1', Py1') and (Px2', Py2')=(Px2+$\delta x$, Py2+$\delta y$).

FIG. 32 shows the drawing data in the drawing data memory means 105 after the operation of FIGS. 29A and 29B, where, as the drawings D1 and D2 have been moved, the ($\delta x, \delta y$) is added to the coordinates registered in the attribute field of the drawing D1 as well as to the starting position in the attribute field of the drawing D2.

Now, in the above described operations, a method for searching out the window related to the drawing at the steps S3 of FIG. 19 and the step S43 of FIG. 29A and a method for searching out the drawing related to the window at the step S49 of FIG. 29B will be described.

Figure 33:
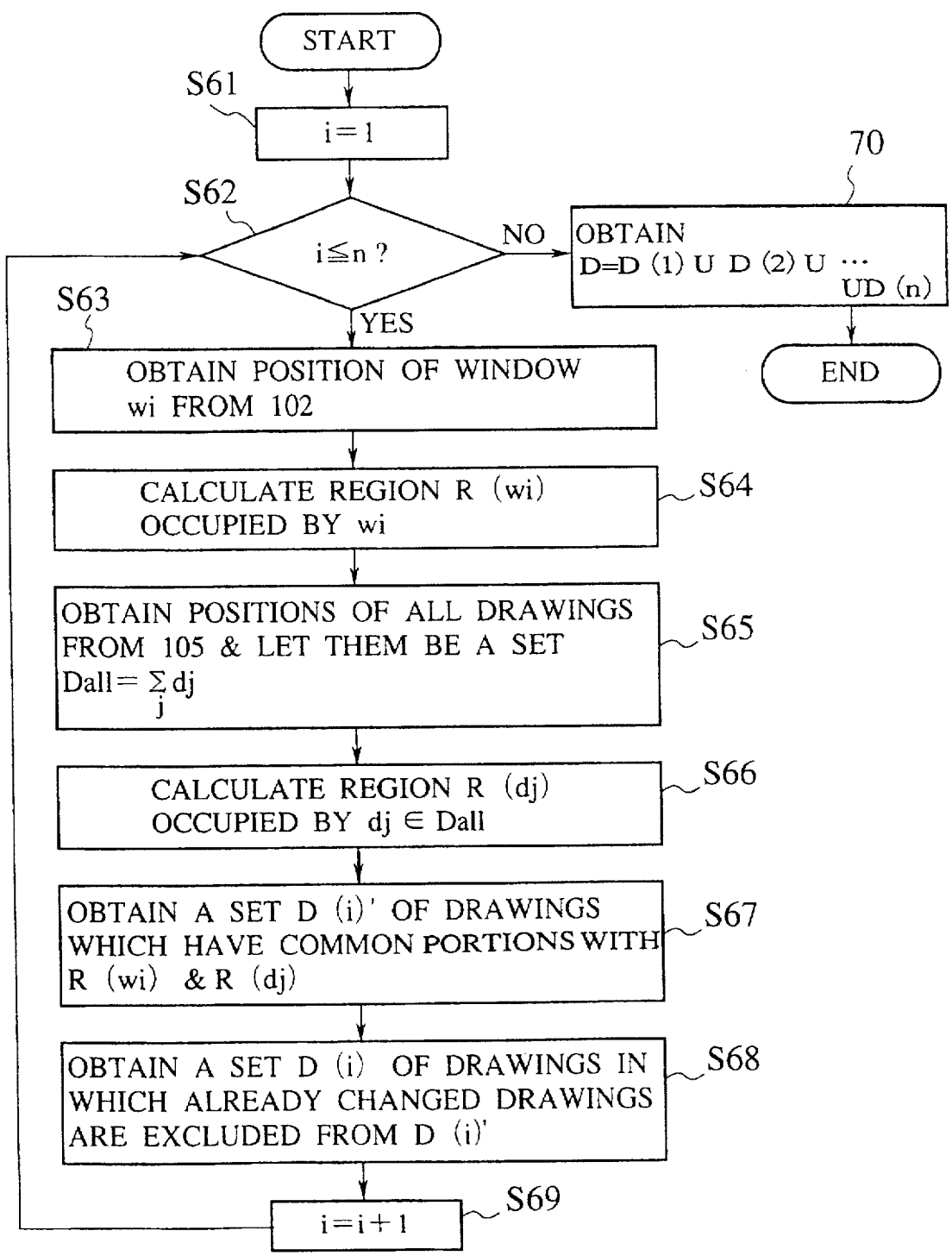
FIG. 33 is a flow chart of an operation at a drawing window correspondence means in the system of FIG. 15 in a case of relating drawings from windows.

In a case of searching out the drawing set D related to the window set W, the drawing window correspondence means 107 operates according to the flow chart of FIG. 33 as follows.

First, for each element wi of the window set W, that is for i=1 to n (steps S61, S62, and S69), the position of the window wi is obtained from the window data memory means 102 (step S63), and a region R(wi) occupied by the window wi is calculated from the position and size of the window wi registered in the window data memory unit 102 (step S64).

Then, the positions of all the drawings are obtained from the drawing data memory means 105 to form a set $D_{all}$ (step S65), and a region R(dj) occupied by each drawing dj$\in D_{all}$ is calculated from the type and attribute registered in the drawing data memory unit 105 (step S66). Here, in a case of the character string, a region occupied by the character string as a whole can be calculated from the starting position and the size, while in a case of the freehand curve, a region can be calculated as the coordinate positions at which the points constituting its point sequence are located, for example. The other manners of defining the region occupied by each type of drawing may be used instead.

Figure 34A:
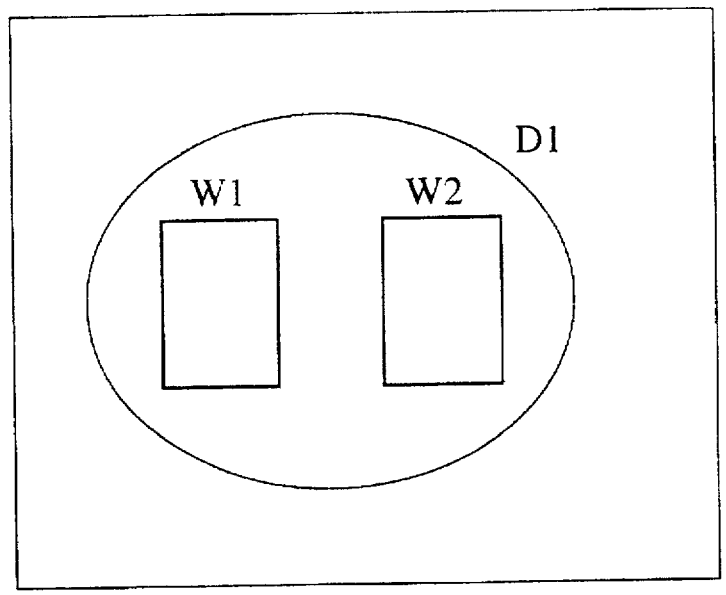
FIGS. 34A and 34B are illustrations of two possible manners of defining a region occupied by each type of drawing in the system of FIG. 15.
Figure 34B:
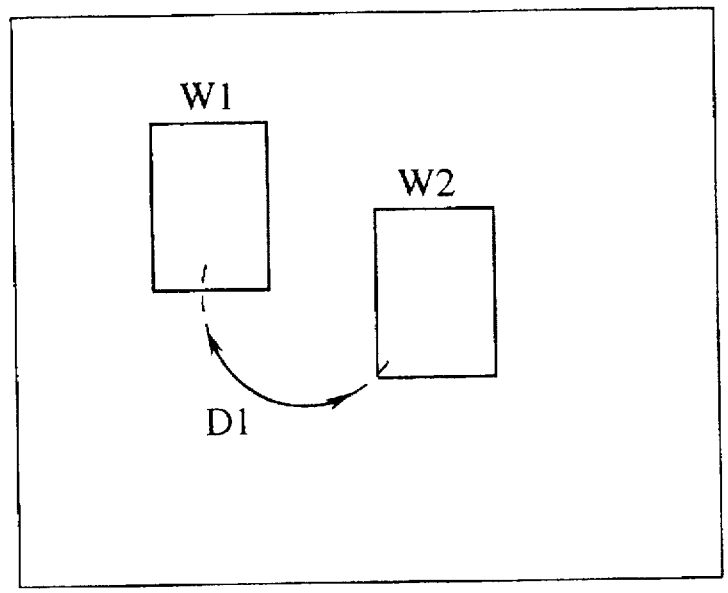

For instance, as shown in FIG. 34A, in a case of the drawing D1 which is a closed curve, not only just the points on the curve but also an area enclosed by the curve may be considered as a part of its region. Also, as shown in FIG. 34B, in a case of the drawing D1 which is an arrow, not only just the points on the arrow but also the points extrapolating the arrow as indicated by dashed lines on both sides of the arrow in FIG. 34B may be considered as a part of its region.

Next, a set D(i)' of those drawings which have portions common to both R(wi) and R(dj) is obtained (step S67), and then a set D(i) of drawings in which the already changed drawings among the drawings belonging to the set D(i)' are excluded from the set D(i)' as it is unnecessary to change them further (step S68).

After these steps S63 to S68 are completed for each element wi of the window set W to obtain the sets D(1), D(2), ..., D(n), the drawing set D of the drawings related to the window set W is obtained as a union of these sets D(i) (step S70). In this manner, it is possible to relates the drawings from the windows while reflecting the intention behind the input entered by the user.

Figure 35:
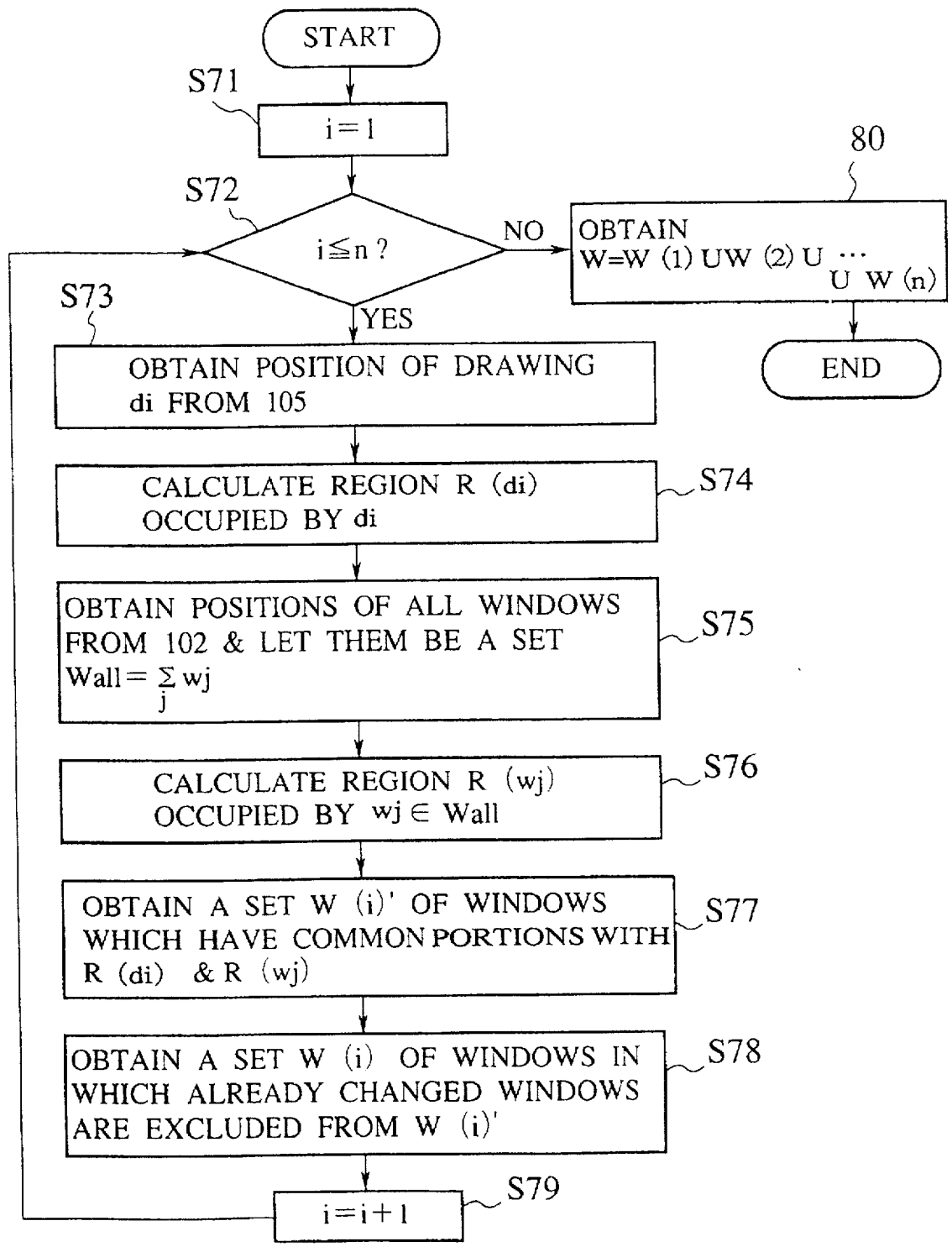
FIG. 35 is a flow chart of an operation at a drawing window correspondence means in the system of FIG. 15 in a case of relating windows from drawings.

On the other hand, in a case of searching out the window set W related to the drawing set D, the drawing window correspondence means 107 operates according to the flow chart of FIG. 35 as follows.

First, for each element di of the drawing set D, that is for i=1 to n (steps S71, S72, and S79), the position of the drawing di is obtained from the drawing data memory means 105 (step S73), and a region R(di) occupied by each drawing di is calculated from the type and attribute registered in the drawing data memory unit 105 (step S74). Here, the method for calculating the region occupied by each drawing di is similar to that used in the step S64 of FIG. 33 described above.

Then, the positions of all the windows are obtained from the window data memory means 102 to form a set $W_{all}$ (step S75), and a region R(wj) occupied by the window wj is calculated from the position and size of the window wj registered in the window data memory unit 102 (step S76).

Next, a set W(i)' of those windows which have portions common to both R(di) and R(wj) is obtained (step S77), and then a set W(i) of windows in which the already changed windows among the windows belonging to the set W(i)' are excluded from the set W(i)' as it is unnecessary to change them further (step S78).

After these steps S73 to S78 are completed for each element di of the drawing set D to obtain the sets W(1), W(2), . . . , W(n), the window set W of the windows related to the drawing set D is obtained as a union of these sets W(i) (step S80). In this manner, it is possible to relates the windows from the drawings while reflecting the intention behind the input entered by the user.

It is to be noted that the types of change that can be made with respect to the windows are not necessarily limited to the moving, closing, and opening described above, and the other types of change such as a size change can be made in a similar manner to preserve the relative positions of the related drawings with respect to the changed window as well as the other windows related to these drawings.

It is to be noted that, instead of searching out the correspondence between the windows and the drawings by the drawing window correspondence means 107 every time there is a change in the window, a correspondence table for the windows and drawings may be prepared at a time of producing the windows and drawings, and the correspondence between the windows and the drawings may be obtained by simply looking up this correspondence table. In this case, the correspondence table can be prepared by the operations of FIGS. 33 and 35 described above for example.

Figure 36:
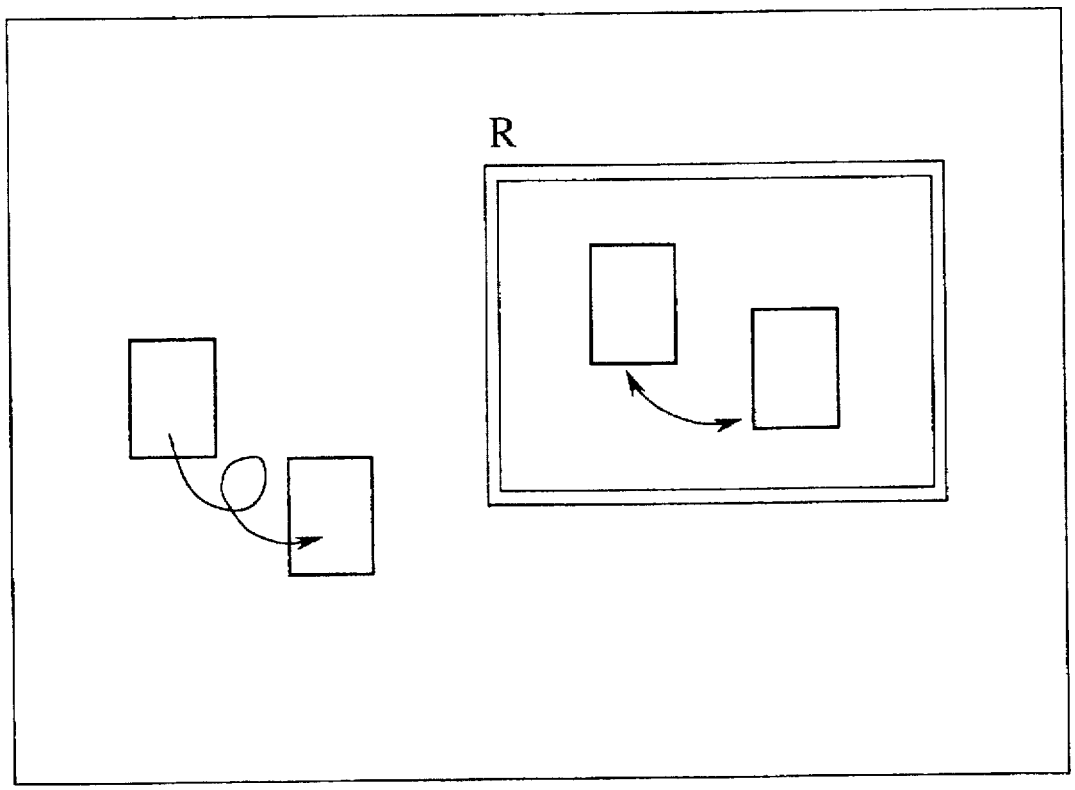
FIG. 36 is an illustration of an exemplary screen display in the system of FIG. 15 in a case of specifying a region for applying the screen display control according to the present invention.

It is also possible to make the change of the drawing in correspondence to the change of the window only within a specified region R on the window display as indicated in FIG. 36, where the operations as described above can be carried out only within the specified region R, so that outside of this specified region R, the windows alone are changed on the display. It is obviously possible to reverse this relationship to make it such that the operations as described above can be carried out only outside of the specified region R while the windows alone are changed within the specified region R.

It is also to be noted that whether or not the drawing changing operation can be carried out within a certain specified region is not necessarily be fixed, and can be dynamically changed. Such a dynamic changing of the manner of handling the drawing changing operation may be commanded either by the user or by the program.

As described, according to this second embodiment, it becomes possible to provide a method and an apparatus for controlling a screen display capable of preserving the meaning attributed to the drawings related to the windows when some window is changed at a part with respect to which the drawing inputs are entered while the application program not accounting for the drawing inputs is executed on that window.

It is to be noted here that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An apparatus for controlling a screen display, comprising:

a server unit for transmitting received inputs as input events, and issuing display requests for requesting the screen display; and a relay unit for relaying the input events transmitted from the server unit to an application program and output requests transmitted from the application program to the server unit, and soliciting first types of the input events solicited by the application program as well as second types of the input events other than the first types to the server unit;

wherein the server unit transmits the first and second types of the input events solicited by the relay unit to the relay unit and issues the display requests in response to the output requests transmitted from the relay unit.

2. The apparatus of claim 1, wherein the screen display provided in response to the display requests is a window display.

3. The apparatus of claim 1, wherein the relay unit transmits only the first types of the input events solicited by the application program to the application program.

4. The apparatus of claim 1, wherein the relay unit also supplies the output requests to the server unit in response to the second types of the input events solicited by the relay unit and transmitted from the server unit.

5. A method for controlling a screen display, comprising the steps of:

soliciting first types of input events solicited by an application program as well as second types of input events other than the first types from a relay program to a server program;

obtaining the input events from received inputs, and transmitting the first and second types of the input events from the server program to the relay program;

relaying the input events transmitted from the server program to the application program, and output requests transmitted from the application program to the server program, at the relay program;

issuing display requests for requesting the screen display from the server program in response to the output requests relayed by the relay program; and providing the screen display according to the display requests supplied from the server program.

6. The method of claim 5, wherein at the providing step, the screen display provided in response to the display requests is a display window.

7. The method of claim 5, wherein at the relaying step, the relay program relays only the first types of the input events solicited by the application program to the application program.

8. The method of claim 5, wherein at the relaying step, the relay program also supplies the output requests to the server program in response to the second types of the input events solicited by the relay program and transmitted from the server program.

* * * * *